US010328389B2

(12) United States Patent
Jiang et al.

(10) Patent No.: US 10,328,389 B2
(45) Date of Patent: Jun. 25, 2019

(54) MICROPOROUS ARTICLES WITH A THREE-DIMENSIONAL POROUS NETWORK OF ACID-SINTERED INTERCONNECTED SILICA NANOPARTICLES AND METHODS OF MAKING THE SAME

(71) Applicant: 3M INNOVATIVE PROPERTIES COMPANY, St. Paul, MN (US)

(72) Inventors: Xuan Jiang, Maplewood, MN (US); Kuan-Yin Lin, Woodbury, MN (US); Michelle M Mok, St. Paul, MN (US); Naiyong Jing, St. Paul, MN (US); Derek J. Dehn, Maplewood, MN (US); Richard J. Pokorny, Maplewood, MN (US); Ta-Hua Yu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 194 days.

(21) Appl. No.: 15/300,022

(22) PCT Filed: Apr. 3, 2015

(86) PCT No.: PCT/US2015/024318
§ 371 (c)(1),
(2) Date: Sep. 28, 2016

(87) PCT Pub. No.: WO2015/157119
PCT Pub. Date: Oct. 15, 2015

(65) Prior Publication Data
US 2017/0173535 A1 Jun. 22, 2017

Related U.S. Application Data
(60) Provisional application No. 61/978,489, filed on Apr. 11, 2014.

(51) Int. Cl.
H01M 2/16 (2006.01)
B01D 61/14 (2006.01)
(Continued)

(52) U.S. Cl.
CPC ......... *B01D 61/147* (2013.01); *B01D 61/145* (2013.01); *B01D 67/0039* (2013.01);
(Continued)

(58) Field of Classification Search
CPC ................ B01D 61/145; B01D 61/147; B01D 67/0039; B01D 67/0044; B01D 67/0069;
(Continued)

(56) References Cited

U.S. PATENT DOCUMENTS 4,539,256 A 9/1985 Shipman
4,567,221 A 1/1986 Maruyama
(Continued)

FOREIGN PATENT DOCUMENTS

CN 101664647 3/2010
CN 102933639 2/2013
(Continued)

OTHER PUBLICATIONS

Armstrong, "The Hydrodynamic Radii of Macromolecules and Their Effect on Red Blood Cell Aggregation," Biophysical Journal, Dec. 2004, vol. 87, pp. 4259-4270.
(Continued)

Primary Examiner — James C Goloboy
(74) Attorney, Agent, or Firm — Adrian L. Pishko

(57) ABSTRACT

Articles are described including a first microfiltration membrane layer having a first major surface and a second major surface disposed opposite the first major surface, and a first silica layer directly attached to the first major surface of the first microfiltration membrane layer. The first silica layer includes a polymeric binder and acid-sintered intercon-
(Continued)

nected silica nanoparticles arranged to form a continuous three-dimensional porous network. A method of making an article is also described, including providing a first microfiltration membrane layer having a first major surface and a second major surface disposed opposite the first major surface, and forming a first silica layer on the first major surface.

20 Claims, 9 Drawing Sheets

(51) Int. Cl.
    B01D 67/00    (2006.01)
    B01D 69/10    (2006.01)
    B01D 69/12    (2006.01)
    B01D 69/14    (2006.01)
    B01D 71/02    (2006.01)
    B01D 71/38    (2006.01)

(52) U.S. Cl.
    CPC ..... *B01D 67/0044* (2013.01); *B01D 67/0069* (2013.01); *B01D 67/0079* (2013.01); *B01D 67/0088* (2013.01); *B01D 69/105* (2013.01); *B01D 69/12* (2013.01); *B01D 69/148* (2013.01); *B01D 71/027* (2013.01); *B01D 71/028* (2013.01); *H01M 2/166* (2013.01); *H01M 2/1686* (2013.01); *B01D 69/10* (2013.01); *B01D 71/38* (2013.01); *B01D 2325/022* (2013.01)

(58) Field of Classification Search
    CPC ............ B01D 67/0079; B01D 67/0088; B01D 69/10; B01D 69/105; B01D 69/12; B01D 69/148; B01D 71/027; B01D 71/028; B01D 71/38; B01D 2325/022; H01M 2/166; H01M 2/1686
    See application file for complete search history.

(56) References Cited

U.S. PATENT DOCUMENTS

| | | | |
|---|---|---|---|
| 4,623,670 A | 11/1986 | Mutoh | |
| 4,702,836 A | 10/1987 | Mutoh | |
| 4,726,989 A | 2/1988 | Mrozinski | |
| 5,120,594 A | 6/1992 | Mrozinski | |
| 5,221,497 A | 6/1993 | Watanabe | |
| 5,238,623 A | 8/1993 | Mrozinski | |
| 5,993,954 A | 11/1999 | Radovanovic | |
| 6,040,053 A | 3/2000 | Scholz | |
| 6,432,586 B1 | 8/2002 | Zhang | |
| 6,559,192 B2 | 5/2003 | Maccone | |
| 6,632,850 B2 | 10/2003 | Hughes | |
| 6,746,803 B1 | 6/2004 | Bauer | |
| 7,247,238 B2 | 7/2007 | Mullette | |
| 7,662,517 B2 | 2/2010 | Lee | |
| 7,704,641 B2 | 4/2010 | Yong | |
| 7,709,152 B2 | 5/2010 | Kim | |
| 7,717,272 B2 | 5/2010 | Isomura | |
| 7,723,424 B2 | 5/2010 | Hashemzadeh | |
| 8,222,166 B2 | 7/2012 | Chu | |
| 8,409,746 B2 | 4/2013 | Yong | |
| 8,485,366 B2 | 7/2013 | Isomura | |
| 2006/0194037 A1 | 8/2006 | Fink | |
| 2009/0067807 A1 | 3/2009 | Hirohata | |
| 2010/0035039 A1 | 2/2010 | Jing | |
| 2010/0300960 A1 | 12/2010 | Hishiki | |
| 2011/0033694 A1 | 2/2011 | Jing | |
| 2011/0244013 A1 | 10/2011 | Mrozinski | |
| 2011/0281171 A1 | 11/2011 | Yong | |
| 2011/0297612 A1 | 12/2011 | Hester | |
| 2012/0018370 A1* | 1/2012 | Takahashi | B01D 53/228 210/490 |
| 2012/0035976 A1 | 2/2012 | Flinn | |
| 2012/0108418 A1* | 5/2012 | Nair | B01D 53/228 502/402 |

FOREIGN PATENT DOCUMENTS

| | | | |
|---|---|---|---|
| JP | 04-371220 | 12/1992 | |
| JP | 2002-338229 | 11/2002 | |
| WO | WO 2011/129928 | 10/2011 | |
| WO | WO 2011-139573 | 11/2011 | |
| WO | WO 2012-047422 | 4/2012 | |
| WO | WO 2012-060917 | 5/2012 | |
| WO | WO 2012-064646 | 5/2012 | |
| WO | WO 2012-151197 | 11/2012 | |
| WO | WO 2012-173803 | 12/2012 | |
| WO | WO-2013063197 A1 * | 5/2013 | ............ E04B 1/665 |
| WO | WO 2014-193573 | 12/2014 | |

OTHER PUBLICATIONS

Bragg, "The form birefringence of macromolecules", Acta Crystallographica, 1953, vol. 6, No. 11-12, pp. 865-867.

Li Zhehao, "Effects of thermal efficiency in DCMD and the preparation of membranes with low thermal conductivity", Applied Surface Science, Jul. 21, 2014, vol. 317, pp. 338-349, XP029081096.

Venturoli, "Ficoll and dextran vs. globular proteins as probes for testing glomerular permselectivity: effects of molecular size, shape, charge, and deformability," Am. J. Physiol Renal Physiol, 288, 2005, pp. F605-F613.

International Search report for PCT International Application No. PCT/US2015/024318 dated Jun. 25, 2015, 4 pages.

* cited by examiner

20nm

20nm

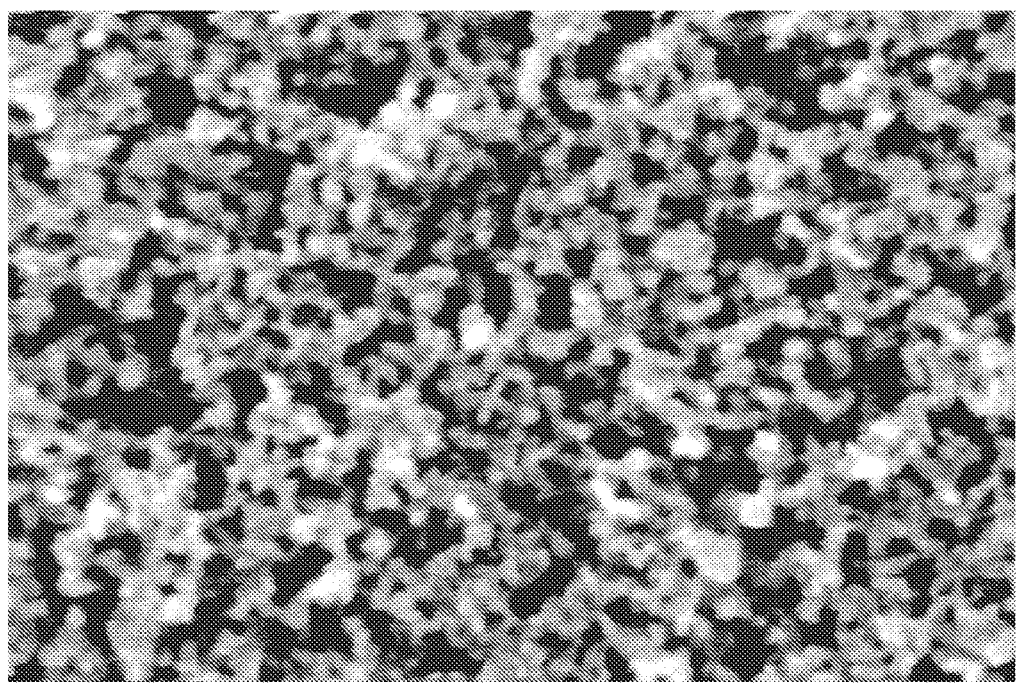
*FIG. 9A*   500nm
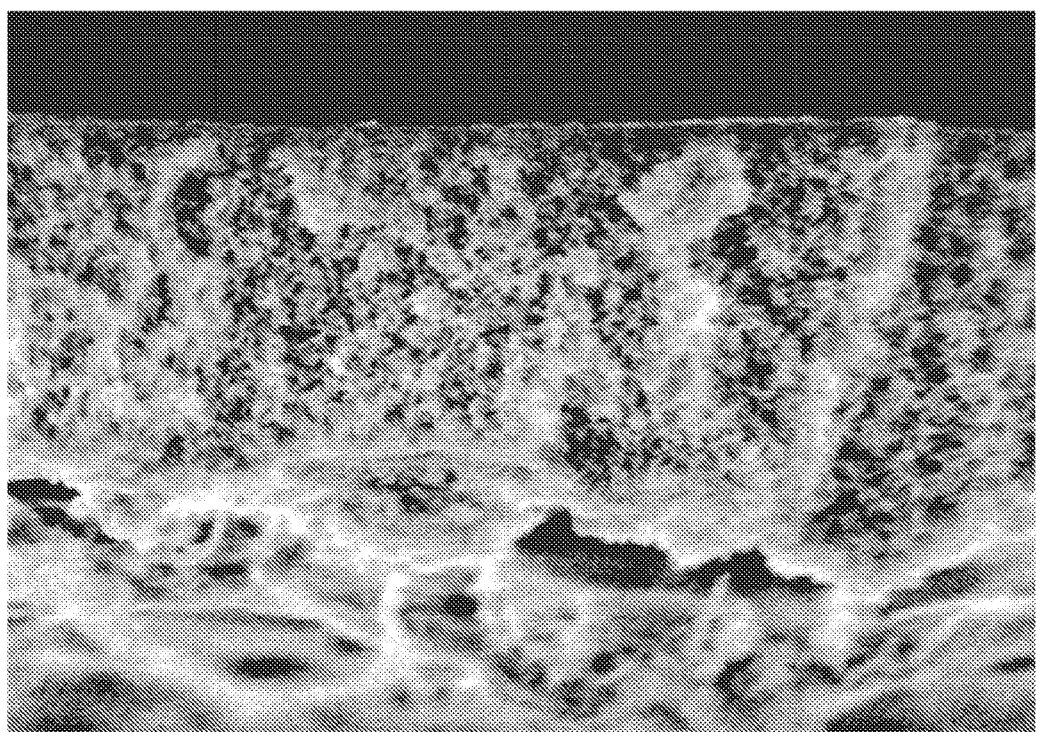
*FIG. 9B*   2.00um

MICROPOROUS ARTICLES WITH A THREE-DIMENSIONAL POROUS NETWORK OF ACID-SINTERED INTERCONNECTED SILICA NANOPARTICLES AND METHODS OF MAKING THE SAME

CROSS REFERENCE TO RELATED APPLICATIONS

This application is a national stage filing under 35 U.S.C. 371 of PCT/US2015/024318, filed Apr. 3, 2015, which claims the benefit of U.S. Application No. 61/978,489, filed Apr. 11, 2014, the disclosure of which is incorporated by reference in its/their entirety herein.

TECHNICAL FIELD

The present disclosure relates to microporous articles and methods of making and using such materials. The disclosure further relates to articles (e.g., sheets, tubes, films, membranes, and the like) that are both microporous and nanoporous.

BACKGROUND

Porous materials are materials that have porous structures which enable fluids to pass readily through them. Porous membranes enjoy utility in a wide range of divergent applications, including use in fluid filtration to remove solid particulates, use in ultrafiltration to remove colloidal matter from fluids, use as diffusion barriers or separators in electrochemical cells, and uses in gas separation and pervaporation. Porous membranes also have been used in the filtration of antibiotics, beers, oils, bacteriological broths, and for the analysis of air, microbiological samples, intravenous fluids and vaccines. Porous membranes have also seen widespread use as battery separators (e.g., in lithium ion batteries).

Microporous materials generally have pores with an effective diameter typically at least several times the mean free path of the molecules passing through them, namely from several micrometers down to as low as about 100 Angstroms (0.01 micrometers). Ultrafiltration membranes generally have pore sizes below 50 nm, and can be expensive to make due to the materials and processes typically employed.

SUMMARY

Briefly, the present disclosure describes exemplary embodiments of an article comprising both a microporous membrane and acid-sintered interconnected silica nanoparticles arranged to form a continuous three-dimensional porous network. In some exemplary methods, these microporous materials can be produced at relatively high rates and low cost. In certain exemplary embodiments, the microporous materials are used to produce articles with advantageous features arising from combination of the microporous material and network of silica nanoparticles.

Accordingly, in a first aspect, the present disclosure describes a multilayer article including:

a) a first microfiltration membrane layer, the first microfiltration membrane layer having a first major surface and a second major surface disposed opposite the first major surface; and b) a first silica layer directly attached to the first major surface of the first microfiltration membrane layer, the first silica layer comprising a polymeric binder and a plurality of acid-sintered interconnected silica nanoparticles arranged to form a continuous three-dimensional porous network.

In a second aspect, the present disclosure describes a method of making a multilayer article including:

a) providing a first microfiltration membrane layer, the first microfiltration membrane layer having a first major surface and a second major surface disposed opposite the first major surface; and b) forming a first silica layer on the first major surface, comprising a polymeric binder and a plurality of acid-sintered interconnected silica nanoparticles arranged to form a continuous three-dimensional porous network.

In a third aspect, the present disclosure describes a multizone article including:

a) a first porous zone comprising first average pore size; and b) a second porous zone integral with the first porous zone and having a second average pore size, the second porous zone comprising a polymeric binder and a plurality of acid-sintered interconnected silica nanoparticles arranged to form a continuous three-dimensional porous network.

The articles described herein are important and useful, for example, for the development of asymmetric membranes for ultrafiltration and desalination, and for the biopharmaceuticals applications including viral clearance and diafiltration.

Various aspects and advantages of exemplary embodiments of the disclosure have been summarized. The above Summary is not intended to describe each illustrated embodiment or every implementation of the present disclosure. The Drawings and the Detailed Description that follow more particularly exemplify certain suitable embodiments using the principles disclosed herein.

BRIEF DESCRIPTION OF DRAWINGS

FIG. 9A is an SEM image of a further exemplary coated membrane surface at a magnification of 100 k times.

FIG. 9B is an SEM image of the exemplary coated membrane of FIG. 9A, of a cross-section of the membrane at a magnification of 20 k times.

Figure 1A:
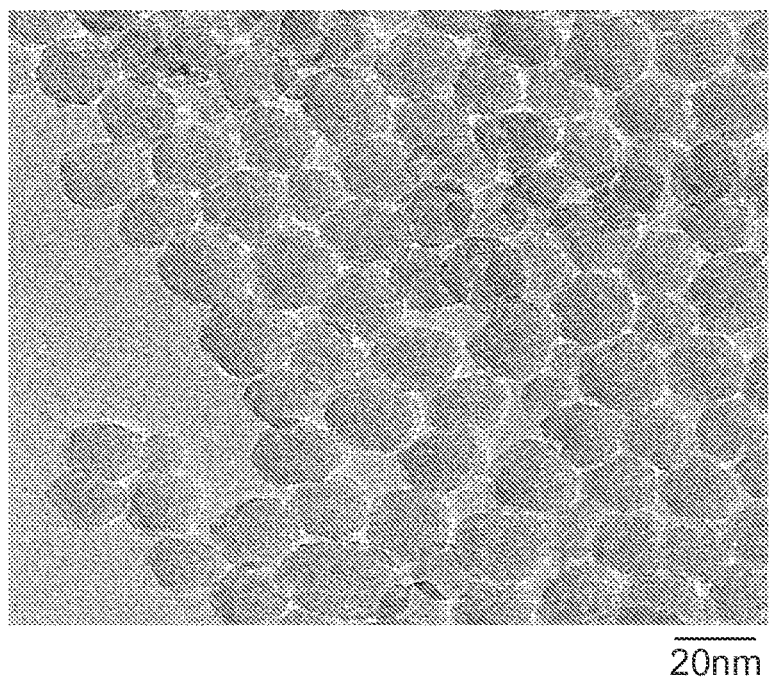
FIG. 1A is a transmission electron micrograph of a comparative example silica layer formed without acid-sintering of the silica nanoparticles.

While the above-identified drawings, which may not be drawn to scale, set forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Various exemplary embodiments of the disclosure will now be described, with particular reference to the Examples and the Figures. Exemplary embodiments of the disclosure may take on various modifications and alterations without departing from the spirit and scope of the disclosure. Accordingly, it is to be understood that the embodiments of the disclosure are not to be limited to the following described exemplary embodiments, but is to be controlled by the limitations set forth in the claims and any equivalents thereof.

As used throughout this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used throughout this specification and the appended embodiments, the words "suitable" and "preferably" refer to embodiments of the disclosure that may afford certain benefits under certain circumstances. Other embodiments may also be suitable, however, under the same or other circumstances. Furthermore, the recitation of one or more suitable embodiments does not imply that other embodiments are not useful, and is not intended to exclude other embodiments from the scope of the disclosure.

As used throughout this specification and the appended embodiments, the term "comprises" and variations thereof do not have a limiting meaning where these terms appear in the description and claims.

As used throughout this specification and the appended embodiments, the recitation of numerical ranges by endpoints includes all numbers subsumed within that range (e.g. 1 to 5 includes 1, 1.5, 2, 2.75, 3, 3.8, 4, and 5).

Unless otherwise indicated throughout this specification and the appended embodiments, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, including the claims:

Glossary

The term "(co)polymer" is used herein to refer to a homo(co)polymer or a (co)polymer.

The term "microporous" is used herein to mean a material comprising a network of interconnected pores having a median diameter less than one micrometer.

The term "acid-sintered silica nanoparticles" means silica nanoparticles that have been subjected to an acid having a pKa less than 3.5, such that a dispersion of the silica nanoparticles has a pH in a range of 2 to 5. Typically, thermal sintering of silica requires temperatures of about 70% of the melting point temperature of about 1400-1700° C.; however, the acid-sintered silica nanoparticles are instead chemically sintered by the acid. Optionally, the acid-sintered silica nanoparticles are also exposed to temperatures as high as about 250° C. during drying/curing process for the article.

The term "hydrolyzable group" refers to a group that can react with water having a pH of 1 to 10 under conditions of atmospheric pressure. The hydrolyzable group is often converted to a hydroxyl group when it reacts. The hydroxyl group often undergoes further reactions. Typical hydrolyzable groups include, but are not limited to, alkoxy, aryloxy, aralkyloxy, acyloxy, or halo.

The term "alkoxy" refers to refers to a monovalent group having an oxy group bonded directly to an alkyl group.

The term "aryloxy" refers to a monovalent group having an oxy group bonded directly to an aryl group.

The term "aralkyloxy" refers to a monovalent group having an oxy group bonded directly to an aralkyl group. Equivalently, it can be considered to be an alkoxy group substituted with an aryl group.

The term "acyloxy" refers to a monovalent group of formula —O(CO)$R^b$ where $R^b$ is alkyl, aryl, or aralkyl. Suitable alkyl $R^b$ groups often have 1 to 10 carbon atoms, 1 to 6 carbon atoms, or 1 to 4 carbon atoms. Suitable aryl $R^b$ groups often have 6 to 12 carbon atoms such as, for example, phenyl. Suitable aralkyl $R^b$ groups often have an alkyl group with 1 to 10 carbon atoms, 1 to 6 carbon atoms, or 1 to 4 carbon atoms that is substituted with an aryl having 6 to 12 carbon atoms such as, for example, phenyl.

The term "halo" refers to a halogen atom such as fluoro, bromo, iodo, or chloro.

The term "PVA" refers to poly(vinyl alcohol), derivatives thereof, and mixtures of poly(vinyl alcohol) and its derivatives. The degree of hydrolysis of PVA or its derivatives is from 50 to 100 percent, or 70 to 100 percent, or 85 to 100 percent. For example, the PVA can include up to 50 percent polyvinyl acetate.

The term "TIPS" refers to Thermally Induced Phase Separation.

The term "wt %" is used in accordance with its conventional industry meaning and refers to an amount based upon the total weight of solids in the referenced composition.

A number of methods for making microporous films and membranes are taught in the art. One of the most useful methods involves thermally induced phase separation. Generally such a process is based on the use of a polymer or (co)polymer that is soluble in a diluent at an elevated temperature but that is insoluble in the diluent material at a relatively lower temperature. Examples of such methods are described in U.S. Pat. Nos. 4,539,256, 4,726,989, and 5,120,594; and U.S. Application Publication No. 2011/0244013.

Articles described herein were developed and found useful for the creation of asymmetric articles having an average pore size of less than 50 nanometers at one surface, including a microfiltration membrane as a substrate. The articles include acid catalyzed low temperature sintered bonded nanosilica and a reactive binder polymer to provide the small average pore size, and high flux due to the micropores of the microfiltration membrane.

As disclosed above, in a first aspect a multilayer article is provided including a) a first microfiltration membrane layer, the first microfiltration membrane layer having a first major surface and a second major surface disposed opposite the first major surface; and b) a first silica layer directly attached to the first major surface of the first microfiltration membrane layer. The first silica layer includes a polymeric binder and a plurality of acid-sintered interconnected silica nanoparticles arranged to form a continuous three-dimensional porous network.

Further, in a second aspect a multizone article is provided including a) a first porous zone comprising first average pore size; and a second porous zone integral with the first porous zone and having a second average pore size. The second porous zone includes a polymeric binder and a plurality of acid-sintered interconnected silica nanoparticles arranged to form a continuous three-dimensional porous network.

The below description applies to various optional embodiments of the above aspects.

It has been discovered that it is possible to prepare an article (e.g., an ultrafiltration article, battery separator, etc.) that exhibits selectivity and high flux by forming a continuous three-dimensional porous network of acid-sintered interconnected silica nanoparticles including a polymeric binder, in which the network is supported by a microporous material. The network may be referred to as a silica layer, or when integral with the microporous material, the network is a zone of the porous material. Hence, the article is preferably either a multilayer article or a multizone article.

Acid-sintered nanosilica coatings have been prepared by acidifying an aqueous colloidal suspension of nanometer-scale particles to a pH of less than 5, for example 2-3. Such silica nanoparticle coatings include those, for example, described in co-owned U.S. Patent Application Publication Nos. 2011/0033694 (Jing et al.) and 2010/0035039 (Jing et al.) and in co-owned International Application Publication Nos. WO 2012/064646 (Riddle et al.), WO 2011/139573 (Pett et al.), and WO 2012/047422 (Hebrink et al.). At a pH of 2-3, the particles possess little or no net charge, and can thus aggregate and fuse. Upon drying, the particles sinter at temperatures much lower than would be required without acidification.

The term "nanoparticle" refers to particles (e.g., silica particles) that are submicron in size. The nanoparticles have an average particle size, which typically refers to the average longest dimension of the particles, that is no greater than 500 nanometers, no greater than 200 nanometers, no greater than 100 nanometers, no greater than 75 nanometers, no greater than 50 nanometers, no greater than 40 nanometers, no greater than 25 nanometers, or no greater than 20 nanometers. The average particle size is often determined using transmission electron microscopy but various light scattering methods can be used as well. The average particle size refers to the average particle size of the primary silica nanoparticles used to form the silica network. The average particle size typically refers to the average size of non-agglomerated and/or non-aggregated and/or non-sintered single nanoparticles of silica. That is, the average particle size refers to the average particle size of the primary silica nanoparticles prior to sintering under acidic conditions.

Multiple silica nanoparticles are joined together into a three dimensional network by low temperature (e.g., at or near room temperature) sintering in the presence of an acid (i.e., chemical sintering). The silica nanoparticles in the article are acid-sintered. At least some adjacent nanoparticles in the porous network tend to have bonds such as silica "necks" joining them together. These silica necks are typically formed by acidification of the silica nanoparticles, and are attributed to the catalytic action of strong acid in making and breaking siloxane bonds. Stated differently, at least some adjacent silica nanoparticles tend to be joined together forming a three dimensional porous network. The term "network" refers to a continuous three-dimensional structure formed by linking together silica nanoparticles. The term "continuous" means that the individual silica nanoparticles are linked over the dimension of the layer coating. The term "agglomerated" refers to multiple bonding between the silica particles which have many points of contact with one or another. As result of the necking, bonding or entanglements of the silica particles, the original particle shapes may be deformed. Transmission electron microscopy generally reveals that at least 25%, preferably at least 50% of the silica particles in the resultant coatings are bonded to adjacent particles.

FIG. 1A is a transmission electron micrograph of a layer of silica nanoparticles from ethanol at a basic pH. The layer is non-uniform and the individual particles are not linked to the adjacent particles.

Figure 1B:
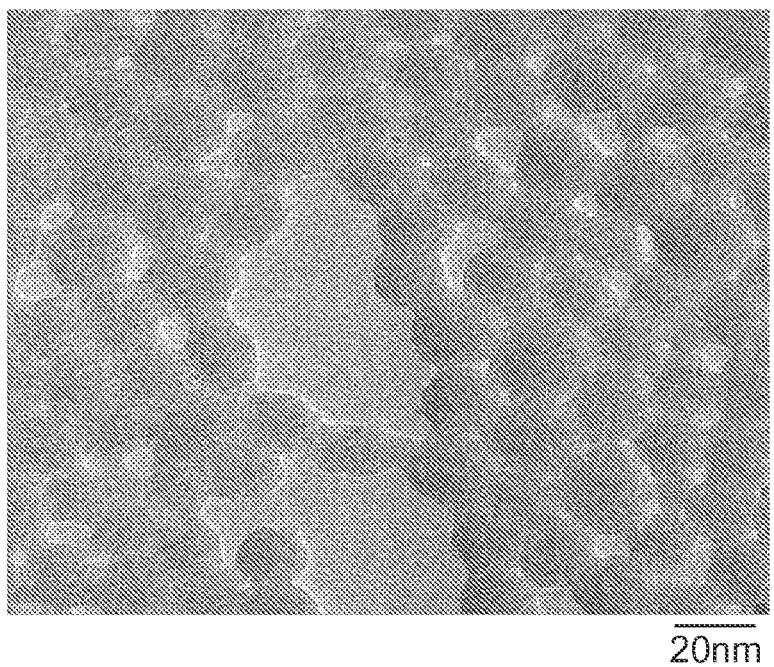
FIG. 1B is a transmission electron micrograph of an exemplary silica layer formed using acid-sintered silica nanoparticles.

In contrast to FIG. 1A, FIG. 1B is a transmission electron micrograph of acid-sintered silica nanoparticles. Unlike chains of fumed silica particles that are simply linear chains of sintered silica nanoparticles, the acid-sintered layer is a continuous network of chemically sintered interconnected nanoparticles that can be arranged to form a three-dimensional layer. The linear chains of fumed silica are not connected together and typically form a layer by combination with a binder such as a polymeric binder. A majority of the polymeric binder (and any organic materials present in the continuous network) described herein is simply located within various pores (e.g., voids) of the interconnected network, although a minority of the polymeric binder present optionally holds some portions of the layer together. Further, chains of fumed silica particles are formed at relatively high temperatures such as at temperatures greater than 300° C., greater than 400° C., or greater than 500° C. In contrast, the acid-sintered network is formed by sintering the silica nanoparticles at relatively low temperatures such as at or near room temperature in the presence of an acid.

The term "porous" refers to the presence of voids between the individual silica nanoparticles within the continuous silica network. Porosity may be calculated from the refractive index of the coating according to published procedures such as in W. L. Bragg, A. B. Pippard, *Acta Crystallographica*, volume 6, page 865 (1953). Porosity tends to correlate to the roughness of the surface. The porosity tends to also correlate with the hydrophilicity of the surface. That is, increased surface roughness tends to lead to increased hydrophilicity. Porosity of the surface can often be increased by using silica nanoparticles with a larger average particle size or by using a mixture of silica nanoparticles with different shapes.

Not wishing to be bound by theory, it is believed that the agglomerates of the silica nanoparticles are formed by through acid-catalyzed siloxane bonding in combination with protonated silanol groups at the particle surfaces and these agglomerates explain the coatability on hydrophobic organic surfaces, as these groups tend to be bonded, adsorbed, or otherwise durably attached to hydrophobic surfaces. Although aqueous organic solvent-based coatings of nanoparticle silica dispersions have been described, such mixtures of water and an organic solvents may suffer from differential evaporation rates that result in continuously changing composition of the liquid phase, which consequently changes the coating properties; resulting in poor uniformity and defects.

The larger the silica particles, the smaller the contact point between adjacent silica particles during formation of neck bonding, thus the larger the pores between the adjacent silica particles. Concomitantly, the smaller the particles, the larger the contact point between adjacent silica particles during formation of neck bonding, thus the smaller the pores between the adjacent silica particles. Selecting particular silica particle sizes of unimodal and/or multimodal distributions is thus one factor in the formation of a controlled pore size silica network.

The primary silica nanoparticles used to prepare acid-sintered silica networks can have any desired shape or mixture of shapes. The silica nanoparticles can be spherical or non-spherical (i.e., acicular) with any desired aspect ratio. Aspect ratio refers to the ratio of the average longest dimension of the nanoparticles to the average shortest dimension of acicular silica nanoparticles. The aspect ratio of acicular silica nanoparticles is often at least 2:1, at least 3:1, at least 5:1, or at least 10:1. Some acicular nanoparticles are in the shape of rods, ellipsoids, needles, and the like. The shape of the nanoparticles can be regular or irregular. The porosity of the coatings can be varied by changing the amount of regular and irregular shaped nanoparticles in the composition and/or by changing the amount of spherical and acicular nanoparticles in the composition.

If the silica nanoparticles are spherical, the average diameter is often up to 500 nanometers, less than 200 nanometers, less than 100 nanometers, less than 50 nanometers, less than 40 nanometers, less than 25 nanometers, or less than 20 nanometers, or up to 20 nanometers. Some nanoparticles can have an even smaller average diameter such as less than 10 nanometers or less than 5 nanometers.

If the silica nanoparticles are acicular, they often have an average width (smallest dimension) equal to at least 1 nanometer, at least 2 nanometers, or at least 5 nanometers. The average width of acicular silica nanoparticles is often no greater than 25 nanometers, no greater than 20 nanometers, or no greater than 10 nanometers. The acicular silica nanoparticles can have an average length $D_1$ measured by dynamic light scattering methods that is, for example, at least 40 nanometers, at least 50 nanometers, at least 75 nanometers, or at least 100 nanometers. The average length $D_1$ (e.g., longer dimension) can be up to 200 nanometers, up to 400 nanometers, or up to 500 nanometers. The acicular colloidal silica particles may have degree of elongation $D_1/D_2$ in a range of 5 to 30, wherein $D_2$ means a diameter in nanometers calculated by the equation $D_2=2720/S$ and S means specific surface area in meters squared per gram ($m^2$/gram) of the nanoparticle, as described in U.S. Pat. No. 5,221,497 (Watanabe et al.).

In certain embodiments, the silica nanoparticles preferably have an average particle size (i.e., longest dimension) that less than or equal to 500 nanometers, less than or equal to 300 nanometers, less than or equal to 200 nanometers, less than or equal to 100 nanometers, greater than 2 nanometers, greater than 5 nanometers, greater than 10 nanometers, greater than 25 nanometers, or greater than 50 nanometers (e.g., in the range of 2 nanometers to 200 nanometers or 100 nanometers to 200 nanometers). Various sizes and/or various shapes of particles may be used in combination.

In certain embodiments, multimodal distributions of particle sizes may be used. For example, nanoparticles having an average particle size of at least 100 nanometers (e.g., in the range of 100 to 200 nanometers or in the range of 100 to 150 nanometers) can be used in combination with nanoparticles having an average diameter no greater than 90 nanometers (e.g., in the range of 2 to 90 nanometers, 5 to 90 nanometers, or 15 to 90 nanometers). The weight ratio of the larger to smaller nanoparticles can be in the range of 2:98 to 98:2, in the range of 5:95 to 95:5, in the range of 10:90 to 90:10, or in the range of 20:80 to 80:20. Coating dispersions having a bimodal distribution of silica nanoparticles can include 0.1 to 50 weight percent silica nanoparticles having an average particle size of 90 nanometers or less and 0 to 50 weight percent silica nanoparticles having an average particle size of 100 nanometers or greater. The amount is based on a total weight of the silica coating dispersion to be applied to a microporous substrate. The silica nanoparticle sizes are selected to provide a controlled pore size of the silica network, as discussed further in the Examples below.

Generally, the total weight of silica nanoparticles (regardless of size) in a silica coating dispersion is at least 0.1 weight percent based on the total weight of the coating dispersion. For example, a silica coating dispersion can include at least 1 weight percent, at least 2 weight percent, or at least 5 weight percent silica nanoparticles. A silica coating dispersion often contains up to 100 weight percent, up to 80 weight percent, up to 60 weight percent, up to 40 weight percent, up to 30 weight percent up to 20 weight percent, or up to 10 weight percent silica nanoparticles. The amount of silica nanoparticles in the silica coating dispersion can be, for example, in the range of 0.1 to 100 weight percent, in the range of 1 to 80 weight percent, in the range of 1 to 50 weight percent, in the range of 1 to 30 weight percent, in the range of 5 to 20 weight percent, in the range of 1 to 10 weight percent, in the range of 5 to 10 weight percent, or in the range of 1 to 7 weight percent.

The silica nanoparticles are typically commercially available in the form of a silica sol, and the silica nanoparticles may be pyrogenic silica or amorphous silica. Some example spherical silica nanoparticles are available in the form of aqueous-based silica sols such as those commercially available under the trade designation LUDOX (e.g., LUDOX SM) from E.I. DuPont de Nemours and Co., Inc. (Wilmington, Del.). Other example aqueous-based silica sols are commercially available under the trade designation NYACOL from Nyacol Co. (Ashland, Mass.). Additional example aqueous-based silica sols are commercially available under the trade designation ECS SI-4530 from Evonik Industries (Parsippany, N.J.). Still other example aqueous-based silica sols are commercially available under the trade designation NALCO (e.g., NALCO 1115, NALCO 2326, NALCO 2327, NALCO 2329, NALCO DVSNZ004, and NALCO 1130) from Ondea Nalco Chemical Co. (Oak Brook, Ill.). Yet other example aqueous-based silica sols are commercially available under the trade designation REMASOL (e.g., REMASOL SP30) from Remet Corporation (Utica, N.Y.) and under the trade designation SILCO (e.g., SILCO LI-518) from Silco International (Portland, Oreg.). Further suitable spherical silica nanoparticles may be obtained in the form of aqueous-based silica sols under the trade designation SNOWTEX from Nissan Chemical Industries (Tokyo, Japan).

Suitable non-spherical (i.e., acicular) silica nanoparticles may be obtained in the form of aqueous-based silica sols under the trade designation SNOWTEX from Nissan Chemical Industries (Tokyo, Japan). For example, SNOWTEX-UP contains silica nanoparticles having a diameter in the range of about 9 to 15 nanometers with lengths in a range of 40 to 300 nanometers. SNOWTEX-PS-S and SNOWTEX-PS-M have a chain of beads morphology. The SNOWTEX-PS-M particles are about 18 to 25 nanometers in diameter and have lengths of 80 to 150 nanometers. The SNOWTEX-PS-S has a particle diameter of 10-15 nm and a length of 80-120 nanometers.

Suitable pyrogenic (i.e., fumed) amorphous silica nanoparticles may be obtained in the form of aqueous-based dispersions under the trade designation CAB-O-SPERSE (e.g, CAB-O-SPERSE 2012A, CAB-O-SPERSE 2017A, CAB-O-SPERSE 2020K, and CAB-O-SPERSE 4012K), from Cabot Corporation (Tuscola, Ill.).

Either water or a water-miscible organic solvent can be used to dilute commercially available aqueous-based silica sols.

The silica coating dispersion contains an acid having a pKa ($H_2O$) that is less than or equal to 3.5. The use of weaker acids such as those having a pKa greater than 4 (e.g., acetic acid) typically does not result a uniform coating (i.e., layer) having desirable transmissivity and/or durability. In particular, coating dispersions with weaker acids such as acetic acid typically bead up on the surface of a substrate. The pKa of the acid added to the coating dispersion is often less than 3, less than 2.5, less than 2, less than 1.5, or less than 1. Useful acids that can be used to adjust the pH of the silica coating dispersion include both organic and inorganic acids. Example acids include, but are not limited to, oxalic acid, citric acid, $H_2SO_3$, $H_3PO_4$, $CF_3CO_2H$, HCl, HBr, HI, $HBrO_3$, $HNO_3$, $HClO_4$, $H_2SO_4$, $CH_3SO_3H$, $CF_3SO_3H$, $CF_3CO_2H$, and $CH_3SO_2OH$. In many embodiments, the acid is HCl, $HNO_3$, $H_2SO_4$, or $H_3PO_4$. Without wishing to be bound by theory, it is believed that some of the silica in contact with acid undergoes a condensation reaction in which silicon dioxide is reacted with acid to form a silicic acid. The silicic acid is capable of forming a continuous three-dimensional porous network of interconnected acid-sintered silica nanoparticles upon drying of the acidified silica coating dispersion. In some embodiments, it is desirable to provide a mixture of an organic and inorganic acid. If commercially available acidic silica sols are used, the addition of one of the acids listed above typically result in silica networks having the desired uniformity.

The silica coating dispersion generally contains sufficient acid to provide a pH no greater than 5. The pH is often no greater than 4.5, no greater than 4, no greater than 3.5, or no greater than 3. For example, the pH is often in the range of 2 to 5. In some embodiments, the silica coating dispersion can be adjusted to a pH in the range of 5 to 6 after first reducing the pH to less than 5. This pH adjustment can allow the coating of pH sensitive substrates. The acid-sintered silica nanoparticles appear to be stable when the pH is in the range 2 to 4. Light-scattering measurements have demonstrated that the acidified silica nanoparticles at pH in the range of 2 to 3 and at a concentration of 10 weight percent silica nanoparticles can retain the same size for more than a week or even more than a month. Such acidified silica coating dispersions are expected to remain stable even longer if the concentration of silica nanoparticles is lower than 10 weight percent.

Silica coating dispersions typically further include water or a mixture of water plus a water-miscible organic solvent. Suitable water-miscible organic solvents include, but are not limited to, various alcohols (e.g., ethanol or isopropanol) and glycols (e.g., propylene glycol), ethers (e.g., propylene glycol methyl ether), ketones (e.g., acetone), and esters (e.g., propylene glycol monomethyl ether acetate). The silica nanoparticles included in the silica coating dispersions typically are not surface modified.

As applied to a substrate surface or intermediary layer, the silica coating dispersion is a sol. After the silica coating dispersion is applied to the substrate or other layer, a gelled material forms as the sol dries and the silica nanoparticles sinter to form the continuous network.

The typical average dry coating thickness of the network is in the range of 0.1 micrometers (μm) to 10.0 μm, 0.5 μm to 2.0 μm, or 0.5 μm to 1.0 μm. Each silica layer typically contains at least 50 weight percent, at least 60 weight percent, at least 70 weight percent, at least 80 weight percent, at least 85 weight percent silica nanoparticles, based on a total weight of the dried silica network. The (dried) silica network can contain up to 90 weight percent, up to 95 weight percent, or up to 99 percent or higher silica nanoparticles based on the total weight of the dried silica network. For example, the dried silica network can contain 50 to greater than 99 weight percent, 50 to 95 weight percent, 50 to 90 weight percent, 50 to 99 weight percent, 75 to 99 percent, 75 to 95 weight percent, 80 to 99 weight percent, or 85 to 95 weight percent silica nanoparticles.

The polymeric binder assists in providing elasticity to the continuous three-dimensional porous network of acid-sintered interconnected silica nanoparticles, which results in greater resistance to damage (e.g., cracking) to the network during preparation, handling, and use of the article. Moreover, the polymeric binder typically adds viscosity to the dispersion to assist in coating the dispersion on the microfiltration membrane. A weight ratio of the silica nanoparticles to the polymer binder is typically in a range from 90:10 to 70:30. Suitable polymeric binders include at least one hydroxyl group or hydrolyzable group that can react with the acid-sintered silica nanoparticles.

In certain embodiments, the polymeric binder comprises poly(vinyl alcohol) (PVA). PVA is a polymer that is known and available commercially. Typically, PVA is prepared by hydrolyzing acetate groups to hydroxyl groups. PVA, silane-modified PVA, and combinations thereof, are employed in certain embodiments of multilayer coatings of the present invention. Silane-modified PVA is believed to provide improved strength to the PVA and/or enhance adhesion of the PVA to the silica nanoparticles. Suitable silane-modified polyvinyl alcohols include those known in the art, such as silane-modified PVA produced via treating vinyl alcohol polymers with one or more ethylenically unsaturated, silane-containing monomers at elevated temperature. See, for example, U.S. Pat. No. 7,723,424 (Hashemzadeh et al.). Alternatively, U.S. Pat. No. 4,567,221 (Maruyama et al.) discloses synthesizing a silylated PVA by copolymerizing vinyl acetate and vinyl alkoxy silanes, subsequently followed by hydrolyzing the acetate groups. Any suitable PVA may be employed, for example KURARAY R-2105, which is a trade designation for a silane modified polyvinyl alcohol polymer commercially available from Kuraray Co. LTD, Japan. Another suitable PVA is KURARAY PVA 235, which is a trade designation for a polyvinyl alcohol polymer that is also commercially available from Kuraray Co. LTD, Japan. In some embodiments the PVA is partially hydrolyzed, whereas in other embodiments the PVA is fully hydrolyzed.

Generally, the total weight of PVA in the silica coating dispersion is at least 0.1 weight percent based on the total weight of the coating dispersion. A silica coating dispersion often contains up to 50 weight percent, up to 30 weight percent, up to 20 weight percent or up to 10 weight percent PVA. For example, a silica coating dispersion can include at least 1 weight percent, at least 2 weight percent, or at least 5 weight percent PVA.

In certain embodiments, the polymeric binder comprises dextran. Dextran is a polymer that is known and available commercially. More particularly, dextran is a water-soluble polysaccharide of glucose produced by the fermentation of *Leuconostoc mesenteroides* on sucrose. It is preferred that the molecular weight of the dextran be greater than about 5,000 grams per mole and more preferred that the molecular weight is greater than about 40,000 grams per mole, such as 100,000 grams per mole or 249,000 grams per mole.

Generally, the total weight of dextran in the silica coating dispersion is at least 0.1 weight percent based on the total weight of the coating dispersion. A silica coating dispersion often contains up to 50 weight percent, up to 30 weight percent, up to 20 weight percent or up to 10 weight percent dextran. For example, a silica coating dispersion can include at least 1 weight percent, at least 2 weight percent, or at least 5 weight percent dextran.

In certain embodiments, the polymeric binder comprises a urethane resin. Suitable urethane resins include polymers made from the reaction product of a compound containing at least two isocyanate groups (—N=C=O), referred to herein as "isocyanates", and a compound containing at least two active-hydrogen containing groups. Examples of active-hydrogen containing groups include primary alcohols, secondary alcohols, phenols and water. Other active-hydrogen containing groups include primary and secondary amines which react with the isocyanate to form a urea linkage, thereby making a polyurea. A wide variety of isocyanate-terminated materials and appropriate co-reactants are well known, and many are commercially available (see, for example, Gunter Oertel, "Polyurethane Handbook", Hanser Publishers, Munich (1985)).

Generally, the total weight of urethane in the silica coating dispersion is at least 0.1 weight percent based on the total weight of the coating dispersion. A silica coating dispersion often contains up to 50 weight percent, up to 30 weight percent, up to 20 weight percent or up to 10 weight percent urethane. For example, a silica coating dispersion can include at least 1 weight percent, at least 2 weight percent, or at least 5 weight percent urethane.

In certain embodiments, the polymeric binder comprises an acrylate resin. Suitable acrylate resins include, e.g., acrylates and methacrylates, vinyl acrylates, acrylated epoxies, acrylated urethanes, acrylated polyesters, acrylated acrylics, acrylated polyethers, vinyl ethers, acrylated oils and acrylated silicones. Suitable acrylates include methyl methacrylate, methacrylic acid, tetrahydrofurfuryl methacrylate, isobornyl acrylate, and isobornyl methacrylate. Multifunctional (meth)acrylic acid esters can optionally be included as crosslinking agents. These multifunctional (meth)acrylates can include, but are not limited to, ethylene glycol dimethacrylate, 1,6-hexanediol dimethacrylate, 1,6-hexanediol diacrylate, trimethylolpropane triacrylate, pentaerythritol tetraacrylate, 1,2-ethylene glycol diacrylate, the dimethacrylate of ethylene oxide modified bisphenol A and the diacrylate of ethylene oxide modified bisphenol A.

Generally, the total weight of acrylate in the silica coating dispersion is at least 0.1 weight percent based on the total weight of the coating dispersion. A silica coating dispersion often contains up to 50 weight percent, up to 30 weight percent, up to 20 weight percent or up to 10 weight percent acrylate. For example, a silica coating dispersion can include at least 1 weight percent, at least 2 weight percent, or at least 5 weight percent acrylate.

In certain embodiments, a surfactant is employed to facilitate contact between the microporous material and the continuous three-dimensional porous network of acid-sintered interconnected silica nanoparticles. Surfactants are molecules having both hydrophilic (polar) and hydrophobic (non-polar) regions and that are capable of reducing the surface tension of a coating dispersion. Useful surfactants may include those disclosed, for example, in U.S. Pat. No. 6,040,053 (Scholz et al.). If added, the surfactant is typically present in an amount up to 5 weight percent based on a total weight of a total silica coating dispersion. For example, the amount can be up to 4 weight percent, up to 2 weight percent, or up to 1 weight percent. The surfactant is typically present in an amount equal to at least 0.001 weight percent, at least 0.005 weight percent, at least 0.01 weight percent, at least 0.05 weight percent, at least 0.1 weight percent or at least 0.5 weight percent of a total silica coating dispersion.

Some surfactants for use in silica coating are anionic surfactants. Useful anionic surfactants often have a molecular structure with (1) at least one hydrophobic group such as a $C_6$-$C_{20}$ alkyl, alkylaryl, and/or alkenyl groups, (2) at least one anionic group such as sulfate, sulfonate, phosphate, polyoxyethylene sulfate, polyoxyethylene sulfonate, polyoxyethylene phosphate, and the like, and/or the salts of such anionic groups. Suitable salts include alkali metal salts, ammonium salts, tertiary amino salts, and the like. Representative commercial examples of useful anionic surfactants include, but are not limited to, sodium lauryl sulfate (available, for example, under the trade designation TEXAPON L-100 from Henkel Inc. (Wilmington, Del.) and under the trade designation POLYSTEP B-3 from Stepan Chemical Co. (Northfield, Ill.)); sodium lauryl ether sulfate (available, for example, under the trade designation POLYSTEP B-12 from Stepan Chemical Co. (Northfield, Ill.)); ammonium lauryl sulfate (available, for example, under the trade designation STANDAPOL A from Henkel Inc. (Wilmington, Del.)); and sodium dodecyl benzene sulfonate (available, for example, under the trade designation SIPONATE DS-10 from Rhone-Poulenc, Inc. (Cranberry, N.J.)).

Other useful surfactants for use in silica coating dispersions are non-ionic surfactants. Suitable non-ionic surfactants include, but are not limited to, polyethoxylated alkyl alcohols (available, for example, under the trade designations BRIJ 30 and BRIJ 35 from ICI Americas, Inc. (Wilmington, Del.) and under the trade designation TERGITOL TMN-6 from Dow Chemical (Midland, Mich.)); polyethoxylated alkyl phenols (available, for example, under the trade designations TRITON X-100 from Roche (Mannheim, Germany) and ICONOL NP-70 from BASF Corp. (Florham Park, N.J.)); and polyethylene glycol/polypropylene glycol block copolymers (available, for example, under the trade designations TETRONIC 1502, TETRONIC 908, and PLURONIC F38 from BASF Corp. (Florham Park, N.J.)).

In certain embodiments, the microfiltration membranes for use in aspects of the present disclosure include Thermally Induced Phase Separation (TIPS) membranes. The pore size of TIPS membranes can be generally controlled due to the ability to select the extent of stretching of the membrane material. TIPS membranes are relatively inexpensive to make, and methods for making them are known to the skilled practitioner. For example, various membranes and methods are described in detail in U.S. Pat. No. 4,726,989 (Mrozinski), U.S. Pat. No. 5,238,623 (Mrozinski), U.S. Pat. No. 5,993,954 (Radovanovic et al.), and U.S. Pat. No. 6,632,850 (Hughes et al.). Microfiltration membranes for use in aspects of the present disclosure also include Solvent Induced Phase Separated (SIPS) membranes and other microporous membranes made by extrusion, extrusion/stretching and extrusion/stretching/extraction processes, and track etching processes.

Suitable microfiltration membranes that may be formed by SIPS include for example and without limitation polyvinylidene fluoride (PVDF), polyether sulfone (PES), polysulfone (PS), polyacrylonitrile (PAN), nylon (i.e., polyamide), cellulose acetate, cellulose nitrate, regenerated cellulose, and polyimide. Suitable microfiltration membranes that may be formed by track etching processes include for example and without limitation polycarbonate and polyester. Suitable microfiltration membranes that may be formed by stretching techniques include for example and without limitation polytetrafluoroethylene (PTFE) and polypropylene.

In certain embodiments, the first microfiltration membrane comprises a thermoplastic polymer, for instance polyethylene, polypropylene, 1-octene, styrene, polyolefin copolymer, polyamide, poly-1-butene, poly-4-methyl-1-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof. One suitable symmetric polypropylene membrane is commercially available under trade designation F100 0.2 Micron Polypropylene Membrane 20.5×500 Roll TIPS from 3M Company (St. Paul, Minn.). The first microfiltration membrane optionally comprises an asymmetric membrane, for example a membrane in which the first major surface of contains pores having a smaller average pore size than the pores of the second major surface of the asymmetric membrane. In such embodiments, the first major surface of the first microfiltration membrane often comprises an average pore size of 50 nm to 500 nm. A suitable asymmetric membrane may be prepared according to U.S. Application Publication No. 2011/0297612 (Hester et al.).

In certain embodiments, as noted above the first microfiltration membrane comprises ethylene chlorotrifluoroethylene (ECTFE). Useful ECTFE membranes may be prepared according to U.S. Pat. No. 4,623,670 (Mutoh et al.), U.S. Pat. No. 4,702,836 (Mutoh et al.), U.S. Pat. No. 6,559,192 (Maccone et al.), U.S. Pat. No. 7,247,238 (Mullette et al.), and PCT Application US2009/067807 (Mrozinski et al.) A suitable ECTFE membrane is commercially available under trade designation PFC020-ECTFE 0.2 UM from 3M Company (St. Paul, Minn.).

In an embodiment, the first microfiltration membrane comprises a ceramic membrane comprising inorganic materials such as aluminum oxide, titanium oxide, zirconium oxide, or silicon carbide. A suitable ceramic membrane is a ceramic aluminum oxide membrane filter available under the trade designation ANOPORE from GE Healthcare Bio-Sciences Corporation, (Piscataway, N.J.).

Figure 2:
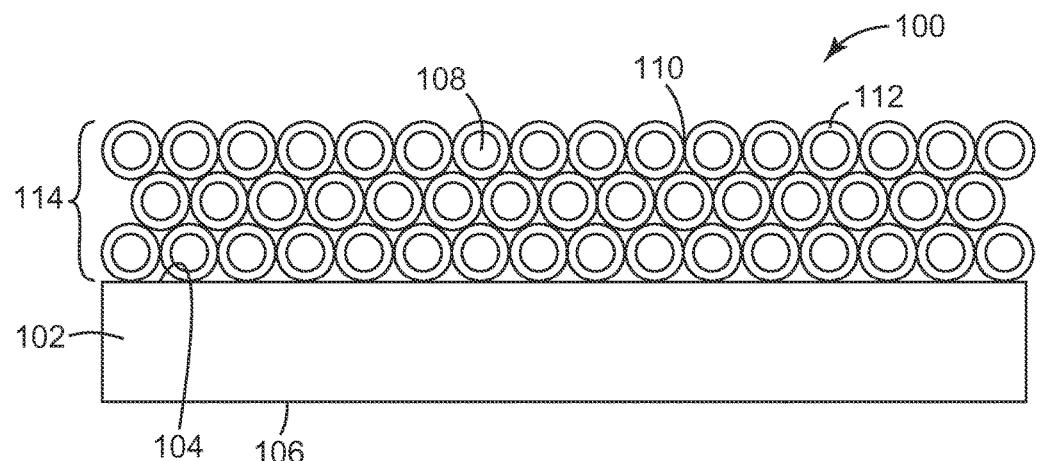
FIG. 2 is a schematic cross-section of an exemplary multilayer article.

Referring to FIG. 2, a schematic cross-section of an exemplary multilayer article is illustrated. The multilayer article 100 includes a first microfiltration membrane layer 102, the first microfiltration membrane layer having a first major surface 104 and a second major surface 106 disposed opposite the first major surface 104. The multilayer article 100 includes a first silica layer 108 directly attached to the first major surface 104 of the first microfiltration membrane layer 102, the first silica layer 108 comprising a polymeric binder 110 and a plurality of acid-sintered interconnected silica nanoparticles 112 arranged to form a continuous three-dimensional porous network 114.

Typically, the first major surface of the microfiltration membrane has an average surface roughness of 10 nm to 900 nm, 400 nm to 900 nm, 100 nm to 500 nm, or even 10 nm to 300 nm. As used herein, the term "surface roughness" refers to the vertical deviation between the outermost portion of a structure and the bulk of the structure. If a microfiltration membrane has a surface roughness greater than about 900 nm, it is particularly difficult to form a thin network of interconnected silica nanoparticles without cracking during drying or without obtaining large gaps in the network.

In many embodiments of a multilayer article, the first silica layer comprises an average thickness of 0.1 micrometers (μm) to 10.0 μm, 0.5 μm to 2.0 μm, or 0.5 μm to 1.0 μm. When the thickness is too thick, the silica layer can decrease the flux through the article, and when the thickness is too thin, it is difficult to form a completely connected network of silica nanoparticles. Moreover, the thinner the layer, the more likely cracking will occur during production and handling. In certain embodiments, the average thickness of the first silica layer is preferably about 1.0 μm.

The first silica layer of a multilayer article preferably comprises an average pore size of up to 500 nm, up to 400 nm, up to 300 nm, up to 200 nm, up to 100 nm, up to 50 nm, up to 40 nm, up to 30 nm, or up to 20 nm, and at least 1 nm, at least 5 nm, at least 10 nm, or at least 20 nm, such as 1 nm to 500 nm, 1 nm to 100 nm, 5 nm to 100 nm, 5 nm to 50 nm, or 20 nm to 50 nm. Accordingly, the multilayer article may be employed as an ultrafiltration article, which typically comprises a pore size range between about 1 nm and 100 nm. The multilayer article may be employed as a battery separator, which is a porous material typically used in a battery to prevent the contact of a negative electrode directly with a positive electrode.

In many embodiments of a multizone article according to the present disclosure, the first porous zone comprises an asymmetric membrane. Asymmetric membranes having a structure with an average pore size at one surface and a smaller average pore size at the opposing surface are advantageous because the second porous zone may be present at a portion having the smaller average pore size. This facilitates forming an integral multizone article, yet the final multizone article exhibits a higher flux than if the first porous zone solely comprised the smaller average pore size. For instance, the first porous zone may contain an average pore size of 50 nm to 500 nm. At a region where the second zone is integral with the first zone, the article includes both a nanoporous material and a microporous material. Typically, the first porous zone has an average surface roughness of 10 nm to 900 nm, 400 nm to 900 nm, 100 nm to 500 nm, or even 10 nm to 300 nm. The second porous zone comprises an average thickness of 0.1 m to 10.0 µm, 0.5 µm to 2.0 µm, or 0.5 µm to 1.0 µm. The second porous zone may comprise an average pore size of up to 500 nm, up to 400 nm, up to 300 nm, up to 200 nm, up to 100 nm, up to 50 nm, up to 40 nm, up to 30 nm, or up to 20 nm, and at least 1 nm, at least 5 nm, at least 10 nm, or at least 20 nm, such as 1 nm to 500 nm, 5 nm to 100 nm, 5 nm to 50 nm or 20 nm to 50 nm. Hence, the multizone article may be employed as an ultrafiltration article, for instance.

Multilayer articles and multizone articles according to aspects of the present disclosure advantageously combine strength and high flux with selectivity and small pore size at one major surface. For example, the articles (e.g., multilayer or multizone) optionally exhibit a forward flow bubble point test result (according to ASTM-F-316-03) using IPA as a wetting fluid with a surface energy of 23 dynes/cm) of 10 pounds per square inch (psi) (69 kilopascals (kPa)) to 60 psi (414 kPa), 25 psi (172 kPa) to 60 psi (414 kPa), or greater than 60 psi (414 kPa), such as up to 100 psi (kPa). Further, the articles (e.g., multilayer or multizone) optionally exhibit a Gurley resistance for 50 cubic centimeters (cc) of air to pass through 6.35 cm$^2$ of the porous membrane at a pressure of 124 mm of water (according to ASTM D726-58, Method A) of 20 seconds to 200 seconds, 25 seconds to 100 seconds, or 15 seconds to 60 seconds. In certain embodiments, the multilayer articles and multizone articles comprise a molecular weight cut off (MWCO) of 1,000 g/mol to 300,000 g/mol, or 6,000 g/mol to 300,000 g/mol. MWCO may be experimentally determined, for instance, using ASTM E1343.17581-1.

As noted above, a method of making a multilayer article is provided including a) providing a first microfiltration membrane layer, the first microfiltration membrane layer having a first major surface and a second major surface disposed opposite the first major surface; and b) forming a first silica layer on the first major surface, comprising a polymeric binder and a plurality of acid-sintered interconnected silica nanoparticles arranged to form a continuous three-dimensional porous network. Preferably, forming the first silica layer includes preparing a dispersion containing the polymer and the silica nanoparticles acidified with an acid having a pKa less than 3.5 to a pH in a range of 2 to 5, coating the dispersion on the substrate to form a coating, and drying the coating to form the plurality of acid-sintered silica nanoparticles. In certain embodiments, the dispersion further contains an alcohol, for example and without limitation isopropyl alcohol, ethanol, methanol, methoxypropanol, or any other alcohol known to wet hydrophobic membrane materials. Including an alcohol can advantageously enhance contact between the dispersion and the first major surface of the microfiltration membrane, allowing the dispersion to interface with the first major surface deeper into the thickness of the membrane.

The dispersion containing the silica nanoparticles optionally comprises silica nanoparticles having a multimodal size distribution, and/or the dispersion containing the silica nanoparticles comprises silica nanoparticles having average particle diameters up to 20 nanometers. Preferably, the method comprises materials in accordance with embodiments of the articles described above. The multilayer coating dispersions can be applied using any suitable application method. Typically, the coating of the dispersion containing the polymeric binder and the silica nanoparticles has a thickness of 0.5 µm to 15 µm, 0.5 µm to 10 µm, or 2.0 µm to 10 µm. The dispersion is coated on the substrate as a single layer using methods known to those of skill in the art. The application method often involves forming a coating by dip coating, bar coating, spin coating, spray coating, wiping, roll coating, brushing, spreading, flow coating, vapor deposition, slot coating, slide coating, or the like, or combinations thereof. The thickness will depend in part on the amount of solvent, viscosity of the components, and final desired silica layer thickness.

In many embodiments, the coating is dried by subjecting the coating to a temperature of up to 250 degrees Celsius, up to 150 degrees Celsius, up to 100 degrees Celsius, 20 degrees Celsius to 250 degrees Celsius, 40 degrees Celsius to 250 degrees Celsius, 40 to 80 degrees Celsius, or even 60 degrees Celsius to 80 degrees Celsius. The temperature resistance of the substrate will typically dictate the upper practical range of drying. An oven with circulating air or inert gas such as nitrogen is often used for drying purposes. It has been discovered that the drying temperature can have a significant impact on the performance of articles having the same composition, as discussed further in the Examples below.

The multilayer and multizone articles disclosed herein may be used in a variety of applications including, but not limited to, ultrafiltration and desalination, viral clearance and diafiltration, separators for lithium ion batteries and capacitors, filters for purification, sterilization, or both of fluid streams in the biopharma, food and beverage, or electronics industries for example.

EXEMPLARY EMBODIMENTS

Embodiment 1 is a multilayer article comprising:
  a) a first microfiltration membrane layer, the first microfiltration membrane layer having a first major surface and a second major surface disposed opposite the first major surface; and
  b) a first silica layer directly attached to the first major surface of the first microfiltration membrane layer, the first silica layer comprising a polymeric binder and a plurality of acid-sintered interconnected silica nanoparticles arranged to form a continuous three-dimensional porous network.
Embodiment 2 is a multilayer article of embodiment 1, wherein the polymeric binder comprises poly(vinyl alcohol) (PVA).
Embodiment 3 is a multilayer article of embodiment 2, wherein the PVA is partially hydrolyzed.
Embodiment 4 is a multilayer article of embodiment 2, wherein the PVA is fully hydrolyzed.
Embodiment 5 is a multilayer article of embodiment 1, wherein the polymeric binder comprises dextran.
Embodiment 6 is a multilayer article of embodiment 1, wherein polymeric binder comprises a urethane resin.
Embodiment 7 is a multilayer article of embodiment 1, wherein polymeric binder comprises an acrylate resin.
Embodiment 8 is a multilayer article of any of embodiments 1 through 7, wherein the article comprises a battery separator.
Embodiment 9 is a multilayer article of any of embodiments 1 through 8, wherein the first silica layer further comprises a surfactant.
Embodiment 10 is a multilayer article of embodiment 9, wherein the surfactant comprises an anionic surfactant.
Embodiment 11 is a multilayer article of any of embodiments 1 through 10, wherein the silica nanoparticles comprise average particle size diameters less than or equal to 200 nanometers (nm).
Embodiment 12 is a multilayer article of any of embodiments 1 through 11, wherein the silica nanoparticles comprise average particle size diameters of 2 nm to 200 nm.

Embodiment 13 is a multilayer article of any of embodiments 1 through 12, wherein the silica nanoparticles comprise average particle size diameters of 5 nm to 100 nm.

Embodiment 14 is a multilayer article of any of embodiments 1 through 13, wherein the silica nanoparticles comprise average particle size diameters of 100 nm to 200 nm.

Embodiment 15 is a multilayer article of any of embodiments 1 through 14, wherein the silica nanoparticles have a unimodal size distribution.

Embodiment 16 is a multilayer article of any of embodiments 1 through 14, wherein the silica nanoparticles have a multimodal size distribution.

Embodiment 17 is a multilayer article of embodiment 16, wherein a weight ratio of a first distribution of silica nanoparticles to a second distribution of silica nanoparticles in the multimodal size distribution is in a range from 20:80 to 80:20.

Embodiment 18 is a multilayer article of embodiment 17, wherein the first distribution of silica nanoparticles comprises average particle size diameters of 100 nm to 200 nm and the second distribution of silica nanoparticles comprises average particle size diameters of 5 nm to 90 nm.

Embodiment 19 is a multilayer article of any of embodiments 1 through 18, wherein the silica nanoparticles comprise fumed silica.

Embodiment 20 is a multilayer article of any of embodiments 1 through 19, wherein the silica nanoparticles comprise amorphous silica.

Embodiment 21 is a multilayer article of any of embodiments 1 through 20, wherein a weight ratio of the silica nanoparticles to the polymer binder is in a range from 90:10 to 70:30.

Embodiment 22 is a multilayer article of any of embodiments 1 through 21, wherein the first microfiltration membrane comprises a Thermally Induced Phase Separation (TIPS) membrane.

Embodiment 23 is a multilayer article of any of embodiments 1 through 21, wherein the first microfiltration membrane comprises a Solvent Induced Phase Separation (SIPS) membrane.

Embodiment 24 is a multilayer article of any of embodiments 1 through 21, wherein the first microfiltration membrane comprises a ceramic membrane.

Embodiment 25 is a multilayer article of any of embodiments 1 through 23, wherein the first microfiltration membrane comprises a thermoplastic polymer.

Embodiment 26 is a multilayer article of embodiment 25, wherein the thermoplastic polymer comprises polyethylene, polypropylene, 1-octene, styrene, polyolefin copolymer, polyolefin copolymer, polyamide, poly-1-butene, poly-4-methyl-1-pentene, polyethersulfone, ethylene tetrafluoroethylene, polyvinylidene fluoride, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, ethylene chlorotrifluoroethylene, or combinations thereof.

Embodiment 27 is a multilayer article of embodiment 25 or 26, wherein the thermoplastic polymer comprises polypropylene.

Embodiment 28 is a multilayer article of embodiment 25 or 26, wherein the thermoplastic polymer comprises ethylene chlorotrifluoroethylene.

Embodiment 29 is a multilayer article of embodiment 25 or 26, wherein the thermoplastic polymer comprises polyamide.

Embodiment 30 is a multilayer article of any of embodiments 1 through 29, wherein the first microfiltration membrane comprises an asymmetric membrane.

Embodiment 31 is a multilayer article of embodiment 30, wherein the first major surface of the asymmetric membrane comprises pores having a smaller average pore size than the pores of the second major surface of the asymmetric membrane.

Embodiment 32 is a multilayer article of any of embodiments 1 through 31, wherein the first major surface of the first microfiltration membrane comprises an average pore size of 50 nm to 500 nm.

Embodiment 33 is a multilayer article of any of embodiments 1 through 32, wherein the first major surface of the first microfiltration membrane comprises an average surface roughness of 10 nm to 900 nm.

Embodiment 34 is a multilayer article of any of embodiments 1 through 33, wherein the first major surface of the first microfiltration membrane comprises an average surface roughness of 10 nm to 300 nm.

Embodiment 35 is a multilayer article of any of embodiments 1 through 34, wherein the first silica layer comprises an average pore size of 1 nm to 100 nm.

Embodiment 36 is a multilayer article of any of embodiments 1 through 35, wherein the first silica layer comprises an average pore size of 5 nm to 50 nm.

Embodiment 37 is a multilayer article of any of embodiments 1 through 36, wherein the first silica layer comprises an average thickness of 0.1 to 10.0 micrometers (µm).

Embodiment 38 is a multilayer article of any of embodiments 1 through 37, wherein the first silica layer comprises an average thickness of 0.5 to 2.0 µm.

Embodiment 39 is a multilayer article of any of embodiments 1 through 38, wherein the first silica layer comprises an average thickness of 0.5 to 1.0 µm.

Embodiment 40 is a multilayer article of any of embodiments 1 through 39, wherein the multilayer article is an ultrafiltration article.

Embodiment 41 is a multilayer article of any of embodiments 1 through 40, wherein the multilayer article exhibits a forward flow bubble point test result using IPA as a wetting fluid with a surface energy of 23 dynes/cm of 10 pounds per square inch (psi) (69 kilopascals (kPa)) to 60 psi (414 kPa).

Embodiment 42 is a multilayer article of any of embodiments 1 through 41, wherein the multilayer article exhibits a forward flow bubble point test result using IPA as a wetting fluid with a surface energy of 23 dynes/cm of 25 psi (172 kPa) to 60 psi (414 kPa).

Embodiment 43 is a multilayer article of any of embodiments 1 through 40, wherein the multilayer article exhibits a forward flow bubble point test result using IPA as a wetting fluid with a surface energy of 23 dynes/cm of greater than 60 psi (414 kPa).

Embodiment 44 is a multilayer article of any of embodiments 1 through 43, wherein the multilayer article exhibits a Gurley resistance of 20 seconds to 200 seconds.

Embodiment 45 is a multilayer article of any of embodiments 1 through 44, wherein the multilayer article exhibits a Gurley resistance of 25 seconds to 100 seconds.

Embodiment 46 is a multilayer article of any of embodiments 1 through 43, wherein the multilayer article has a molecular weight cutoff (MWCO) of 6,000 g/mol to 300,000 g/mol.

Embodiment 47 is a method of making a multilayer article comprising:

a) providing a first microfiltration membrane layer, the first microfiltration membrane layer having a first major surface and a second major surface disposed opposite the first major surface; and b) forming a first silica layer on the first major surface, comprising a polymeric binder and a plurality of acid-sintered interconnected silica nanoparticles arranged to form a continuous three-dimensional porous network.

Embodiment 48 is a method of embodiment 47, wherein forming the first silica layer comprises preparing a dispersion containing the polymer and the silica nanoparticles acidified with an acid having a pKa less than 3.5 to a pH in a range of 2 to 5, coating the dispersion on the substrate to form a coating, and drying the coating to form the plurality of acid-sintered silica nanoparticles.

Embodiment 49 is a method of embodiment 48, wherein the dispersion further comprises an alcohol.

Embodiment 50 is a method of embodiment 49, wherein the alcohol comprises isopropyl alcohol.

Embodiment 51 is a method of any of embodiments 48 through 50, wherein the drying comprises subjecting the coating to a temperature of 20 degrees Celsius to 250 degrees Celsius.

Embodiment 52 is a method of any of embodiments 48 through 51, wherein the drying comprises subjecting the coating to a temperature of 40 degrees Celsius to 250 degrees Celsius.

Embodiment 53 is a method of any of embodiments 48 through 52, wherein the dispersion is coated on the substrate as a single layer using bar coating.

Embodiment 54 is a method of any of embodiments 48 through 53, wherein the coating has a thickness of 0.5 µm to 15 µm.

Embodiment 55 is a method of any of embodiments 48 through 54, wherein the coating has a thickness of 0.5 µm to 10 µm.

Embodiment 56 is a method of any of embodiments 48 through 55, wherein the coating has a thickness of 2.0 µm to 10 µm.

Embodiment 57 is a method of embodiment 47, wherein the polymeric binder comprises poly(vinyl alcohol) (PVA).

Embodiment 58 is a method of embodiment 57, wherein the PVA is partially hydrolyzed.

Embodiment 59 is a method of embodiment 57, wherein the PVA is fully hydrolyzed.

Embodiment 60 is a method of embodiment 48, wherein the dispersion contains up to 10 weight percent polymeric binder.

Embodiment 61 is a method of embodiment 57, wherein the polymeric binder comprises dextran.

Embodiment 62 is a method of embodiment 57, wherein polymeric binder comprises a urethane resin.

Embodiment 63 is a method of embodiment 57, wherein polymeric binder comprises an acrylate resin.

Embodiment 64 is a method of any of embodiments 47 through 63, wherein the first silica layer further comprises a surfactant.

Embodiment 65 is a method of embodiment 64, wherein the surfactant comprises an anionic surfactant.

Embodiment 66 is a method of any of embodiments 47 through 65, wherein the silica nanoparticles comprise average particle size diameters less than or equal to 200 nanometers (nm).

Embodiment 67 is a method of any of embodiments 47 through 66, wherein the silica nanoparticles comprise average particle size diameters of 2 nm to 200 nm.

Embodiment 68 is a method of any of embodiments 47 through 67, wherein the silica nanoparticles comprise average particle size diameters of 100 nm to 200 nm.

Embodiment 69 is a method of any of embodiments 47 through 68, wherein the silica nanoparticles comprise average particle size diameters of 5 nm to 100 nm.

Embodiment 70 is a method of any of embodiments 47 through 69, wherein the silica nanoparticles have a unimodal size distribution.

Embodiment 71 is a method of any of embodiments 47 through 69, wherein the silica nanoparticles have a multimodal size distribution.

Embodiment 72 is a method of embodiment 71, wherein a weight ratio of a first distribution of silica nanoparticles to a second distribution of silica nanoparticles in the multimodal size distribution is in a range from 20:80 to 80:20.

Embodiment 73 is a method of embodiment 72, wherein the first distribution of silica nanoparticles comprises average particle size diameters of 100 nm to 200 nm and the second distribution of silica nanoparticles comprises average particle size diameters of 5 nm to 90 nm.

Embodiment 74 is a method of any of embodiments 47 through 73, wherein the silica nanoparticles comprise fumed silica.

Embodiment 75 is a method of any of embodiments 47 through 74, wherein the silica nanoparticles comprise amorphous silica.

Embodiment 76 is a method of any of embodiments 47 through 75, wherein a weight ratio of the silica nanoparticles to the polymer binder is in a range from 90:10 to 70:30.

Embodiment 77 is a method of any of embodiments 47 through 76, wherein the multilayer article comprises a battery separator.

Embodiment 78 is a method of any of embodiments 47 through 76, wherein the first microfiltration membrane comprises a Thermally Induced Phase Separation (TIPS) membrane.

Embodiment 79 is a method of any of embodiments 47 through 76, wherein the first microfiltration membrane comprises a Solvent Induced Phase Separation (SIPS) membrane.

Embodiment 80 is a method of any of embodiments 47 through 76, wherein the first microfiltration membrane comprises a ceramic membrane.

Embodiment 81 is a method of any of embodiments 47 through 80, wherein the first microfiltration membrane comprises a thermoplastic polymer.

Embodiment 82 is a method of embodiment 81, wherein the thermoplastic polymer comprises polyethylene, polypropylene, 1-octene, styrene, polyolefin copolymer, polyamide, poly-1-butene, poly-4-methyl-1-pentene, polyethersulfone, ethylene tetrafluoroethylene, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, polyvinylidene fluoride, or ethylene chlorotrifluoroethylene.

Embodiment 83 is a method of embodiment 81 or 82, wherein the thermoplastic polymer comprises polypropylene.

Embodiment 84 is a multilayer article of embodiment 81 or 82, wherein the thermoplastic polymer comprises ethylene chlorotrifluoroethylene.

Embodiment 85 is a method of embodiment 81 or 82, wherein the thermoplastic polymer comprises polyamide.

Embodiment 86 is a method of any of embodiments 47 through 85, wherein the first microfiltration membrane comprises an asymmetric membrane.

Embodiment 87 is a method of embodiment 86, wherein the first major surface of the asymmetric membrane comprises pores having a smaller average pore size than the pores of the second major surface of the asymmetric membrane.

Embodiment 88 is a method of any of embodiments 47 through 87, wherein the first major surface of the first microfiltration membrane comprises an average pore size of 50 nm to 500 nm.

Embodiment 89 is a method of any of embodiments 47 through 88, wherein the first major surface of the first microfiltration membrane comprises an average surface roughness of 10 nm to 900 nm.

Embodiment 90 is a method of any of embodiments 47 through 89, wherein the first major surface of the first microfiltration membrane comprises an average surface roughness of 10 nm to 300 nm.

Embodiment 91 is a method of any of embodiments 47 through 90, wherein the first silica layer comprises an average pore size of 1 nm to 100 nm.

Embodiment 92 is a method of any of embodiments 47 through 91, wherein the first silica layer comprises an average pore size of 5 nm to 50 nm.

Embodiment 93 is a method of any of embodiments 47 through 92, wherein the first silica layer comprises an average thickness of 0.1 to 10.0 micrometers (m).

Embodiment 94 is a method of any of embodiments 47 through 93, wherein the first silica layer comprises an average thickness of 0.5 to 2.0 μm.

Embodiment 95 is a method of any of embodiments 47 through 94, wherein the first silica layer comprises an average thickness of 0.5 to 1.0 μm.

Embodiment 96 is a method of any of embodiments 47 through 95, wherein the multilayer article is an ultrafiltration article.

Embodiment 97 is a method of any of embodiments 47 through 96, wherein the multilayer article exhibits a forward flow bubble point test result of 10 pounds per square inch (psi) (69 kilopascals (kPa)) to 60 psi (414 kPa).

Embodiment 98 is a method of any of embodiments 47 through 97, wherein the multilayer article exhibits a forward flow bubble point test result using IPA as a wetting fluid with a surface energy of 23 dynes/cm of 25 psi (172 kPa) to 60 psi (414 kPa).

Embodiment 99 is a method of any of embodiments 47 through 96, wherein the multilayer article exhibits a forward flow bubble point test result using IPA as a wetting fluid with a surface energy of 23 dynes/cm of greater than 60 psi (414 kPa).

Embodiment 100 is a method of any of embodiments 47 through 99, wherein the multilayer article exhibits a Gurley resistance of 20 seconds to 200 seconds.

Embodiment 101 is a method of any of embodiments 47 through 100, wherein the multilayer article exhibits a Gurley resistance of 25 seconds to 100 seconds.

Embodiment 102 is a method of any of embodiments 47 through 99, wherein the multilayer article has a molecular weight cutoff (MWCO) of 6,000 g/mol to 300,000 g/mol.

Embodiment 103 is a multizone article comprising:
  a) a first porous zone comprising first average pore size; and
  b) a second porous zone integral with the first porous zone and having a second average pore size, the second porous zone comprising a polymeric binder and a plurality of acid-sintered interconnected silica nanoparticles arranged to form a continuous three-dimensional porous network.

Embodiment 104 is a multizone article of embodiment 103, wherein the polymeric binder comprises poly(vinyl alcohol) (PVA).

Embodiment 105 is a multizone article of embodiment 104, wherein the PVA is partially hydrolyzed.

Embodiment 106 is a multizone article of embodiment 104, wherein the PVA is fully hydrolyzed.

Embodiment 107 is a multizone article of embodiment 103, wherein the polymeric binder comprises dextran.

Embodiment 108 is a multizone article of embodiment 103, wherein polymeric binder comprises a urethane resin.

Embodiment 109 is a multizone article of embodiment 103, wherein polymeric binder comprises an acrylate resin.

Embodiment 110 is a multizone article of any of embodiments 103 through 109, wherein the second porous zone further comprises a surfactant.

Embodiment 111 is a multizone article of embodiment 110, wherein the surfactant comprises an anionic surfactant.

Embodiment 112 is a multizone article of any of embodiments 103 through 111, wherein the silica nanoparticles comprise average particle size diameters less than or equal to 200 nanometers (nm).

Embodiment 113 is a multizone article of any of embodiments 103 through 112, wherein the silica nanoparticles comprise average particle size diameters of 2 nm to 200 nm.

Embodiment 114 is a multizone article of any of embodiments 103 through 113, wherein the silica nanoparticles comprise average particle size diameters of 100 nm to 200 nm.

Embodiment 115 is a multizone article of any of embodiments 103 through 114, wherein the silica nanoparticles comprise average particle size diameters of 5 nm to 100 nm.

Embodiment 116 is a multizone article of any of embodiments 103 through 115, wherein the silica nanoparticles have a unimodal size distribution.

Embodiment 117 is a multizone article of any of embodiments 103 through 115, wherein the silica nanoparticles have a multimodal size distribution.

Embodiment 118 is a multizone article of embodiment 117, wherein a weight ratio of a first distribution of silica nanoparticles to a second distribution of silica nanoparticles in the multimodal size distribution is in a range from 20:80 to 80:20.

Embodiment 119 is a multizone article of embodiment 118, wherein the first distribution of silica nanoparticles comprises average particle size diameters of 100 nm to 200 nm and the second distribution of silica nanoparticles comprises average particle size diameters of 5 nm to 90 nm.

Embodiment 120 is a multizone article of any of embodiments 103 through 119, wherein the silica nanoparticles comprise fumed silica.

Embodiment 121 is a multizone article of any of embodiments 103 through 120, wherein the silica nanoparticles comprise amorphous silica.

Embodiment 122 is a multizone article of any of embodiments 103 through 121, wherein a weight ratio of the silica nanoparticles to the polymer binder is in a range from 90:10 to 70:30.

Embodiment 123 is a multizone article of any of embodiments 103 through 122, wherein the article comprises a battery separator.

Embodiment 124 is a multizone article of any of embodiments 103 through 123, wherein the first porous zone comprises a Thermally Induced Phase Separation (TIPS) membrane.

Embodiment 125 is a multizone article of any of embodiments 103 through 123, wherein the first microfiltration membrane comprises a Solvent Induced Phase Separation (SIPS) membrane.

Embodiment 126 is a multilayer article of any of embodiments 103 through 123, wherein the first microfiltration membrane comprises a ceramic membrane.

Embodiment 127 is a multizone article of any of embodiments 103 through 126, wherein the first porous zone comprises a thermoplastic polymer.

Embodiment 128 is a multizone article of embodiment 127, wherein the thermoplastic polymer comprises polyethylene, polypropylene, 1-octene, styrene, polyolefin copolymer, polyamide, poly-1-butene, poly-4-methyl-1-pentene, polyethersulfone, ethylene tetrafluoroethylene, polysulfone, polyacrylonitrile, polyamide, cellulose acetate, cellulose nitrate, regenerated cellulose, polyvinyl chloride, polycarbonate, polyethylene terephthalate, polyimide, polytetrafluoroethylene, polyvinylidene fluoride, ethylene chlorotrifluoroethylene, or a combination thereof.

Embodiment 129 is a multizone article of embodiment 127 or 128, wherein the thermoplastic polymer comprises polypropylene.

Embodiment 130 is a multilayer article of embodiment 127 or 128, wherein the thermoplastic polymer comprises ethylene chlorotrifluoroethylene.

Embodiment 131 is a multizone article of embodiment 127 or 128, wherein the thermoplastic polymer comprises polyamide.

Embodiment 132 is a multizone article of any of embodiments 103 through 131, wherein the first porous zone comprises an asymmetric membrane.

Embodiment 133 is a multizone article of embodiment 132, wherein the second porous zone is integral to the asymmetric membrane at a portion comprising a smaller average pore size than the pores of a major surface of the asymmetric membrane opposite the second porous zone.

Embodiment 134 is a multizone article of any of embodiments 103 through 133, wherein the first porous zone comprises an average pore size of 50 nm to 500 nm.

Embodiment 135 is a multizone article of any of embodiments 103 through 134, wherein the first porous zone comprises an average surface roughness of 10 nm to 900 nm.

Embodiment 136 is a multizone article of any of embodiments 103 through 135, wherein the first porous zone comprises an average surface roughness of 10 nm to 300 nm.

Embodiment 137 is a multizone article of any of embodiments 103 through 136, wherein the second porous zone comprises an average pore size of 1 nm to 100 nm.

Embodiment 138 is a multizone article of any of embodiments 103 through 137, wherein the second porous zone comprises an average pore size of 5 nm to 50 nm.

Embodiment 139 is a multizone article of any of embodiments 103 through 138, wherein the second porous zone comprises an average thickness of 0.1 to 10.0 micrometers (μm).

Embodiment 140 is a multizone article of any of embodiments 103 through 139, wherein the second porous zone comprises an average thickness of 0.5 to 2.0 μm.

Embodiment 141 is a multizone article of any of embodiments 103 through 140, wherein the second porous zone comprises an average thickness of 0.5 to 1.0 μm.

Embodiment 142 is a multizone article of any of embodiments 103 through 141, wherein the multizone article is an ultrafiltration article.

Embodiment 143 is a multizone article of any of embodiments 103 through 142, wherein the multizone article exhibits a forward flow bubble point test result using IPA as a wetting fluid with a surface energy of 23 dynes/cm of 10 pounds per square inch (psi) (69 kilopascals (kPa)) to 60 psi (414 kPa).

Embodiment 144 is a multizone article of any of embodiments 103 through 143, wherein the multizone article exhibits a forward flow bubble point test result using IPA as a wetting fluid with a surface energy of 23 dynes/cm of 25 psi (172 kPa) to 60 psi (414 kPa).

Embodiment 145 is a multizone article of any of embodiments 103 through 142, wherein the multizone article exhibits a forward flow bubble point test result using IPA as a wetting fluid with a surface energy of 23 dynes/cm of greater than 60 psi (414 kPa).

Embodiment 146 is a multizone article of any of embodiments 103 through 145, wherein the multizone article exhibits a Gurley resistance of 20 seconds to 200 seconds.

Embodiment 147 is a multizone article of any of embodiments 103 through 146, wherein the multizone article exhibits a Gurley resistance of 25 seconds to 100 seconds.

Embodiment 148 is a multizone article of any of embodiments 103 through 147, wherein the multizone article has a molecular weight cutoff (MWCO) of 6,000 g/mol to 300,000 g/mol.

Exemplary embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Materials

The following terminology, abbreviations, and trade names of materials are used in the Examples:

Colloidal silica dispersions 1115, 2326, 2327, 2329 and DVSNZ004 were obtained from Nalco Company, Naperville, Ill. ECS SI-4530 colloidal silica dispersions were obtained from Evonik, Parsippany, N.J. Pyrogenic (Fumed) amorphous silica dispersions CAB-O-SPERSE® 2012A, 2017A, 2020K, and 4012K, were obtained from Cabot Corporation, Tuscola, Ill. 61953.

Fully hydrolyzed polyvinyl alcohol resins, PVA 098-03, 04, 05, 15, 20, 60, were obtained from Marubeni Specialty Chemicals Inc. (manufacturer: Sinopec Chemical, China), White Plains, N.Y. 10606. PVA "R-polymer" resin, Kuraray PVA R-2105, and partially hydrolyzed polyvinyl alcohol resin, Kuraray PVA R-235, were obtained from Kuraray America, Inc., Houston, Tex. 77058.

Polyurethane dispersion, NeoRez R-966, and acrylic emulsion, NeoCryl A612, were obtained DSM NeoResins Inc., Wilmington, Mass. 01887. Poly(acrylamide-acrylic acid) copolymer, sodium salt, MW: 200,000 (70% carboxy) was obtained from Polysciences, Inc., Warrington, Pa. 18976. Wetting agent, POLYSTEP® A-18, B-19, and B-430S, were obtained from Stepan Company, Northfield, Ill. 60093.

Isopropanol (IPA) and glycerol were purchased from VWR International (1310 Goshen Parkway, West Chester, Pa. 19380).

Ethylene-vinyl alcohol (EVAL) copolymer (EVAL 27) having an ethylene content of 27 mole % was purchased from Sigma Aldrich, St. Louis, Mo.

Blue Dextran was purchased from Sigma-Aldrich (Milwaukee, Wis. 53233).

Polyethylene glycol (PEG) materials were used with molecular weights of 1, 6, 35, 100 and 300 kDa, available from Sigma-Aldrich Corp., St. Louis, Mo. or Alfa Aesar, Ward Hill, Mass.

MilliQ-grade water from a MilliQ Gradient A10 system (EMD Millipore (Billerica, Mass.)) was used for MWCO and flux testing.

TIPS Membrane Films

Two PP films were used for exploration. Standard F100 0.2 μm grade 3M PP TIPS membrane was used to prove the concept. A two-zone PP experimental roll a two-zone ECTFE experimental roll, prepared according to U.S. Application Publication No. 2011/0297612, were used for optimization flux and retention performance. An ECTFE roll (PFC020-ECTFE 0.2 UM membrane) was used for exploration and for continuous coating.

Test Methods

The following test methods have been used to evaluate microporous materials prepared according to the present disclosure.

1) Bubble Point Test

The Bubble Point pore size is the bubble point value representing the largest effective pore size in a sample, measured in microns, according to ASTM-F-316-03 using 60:40 IPA:H2O with a surface energy of 23 dynes/cm as a wetting fluid and a 142 mm disc for the sample size.

2) Gurley Test

Gurley resistance to air flow is the time in seconds for 50 cubic centimeters (cc) of air, or another specified volume, to pass through 6.45 cm² (one square inch) of the porous membrane at a pressure of 124 mm of water according to ASTM D726-58, Method A.

3) Blue Dextran Filtration Test

The Blue Dextran test challenged the membrane with a solution containing dyed, high molecular weight polymer (MW~2 million) to determine whether the material could have an average pore size in the range for ultrafiltration.

A challenge solution was prepared by dissolving Blue Dextran in a DI water/IPA mixture (65/35 vol/vol). Membrane samples were cut into 47-mm diameter discs and pre-wet with DI water or an IPA/DI water mixture. The samples were placed into a holder for normal flow filtration with support discs underneath (3M BLA020 grade nylon microfiltration membrane, available from 3M Company, and Typar nonwoven, available from Geo-Synthetics, Waukesha, Wis.). The Blue Dextran solution was applied at 30 psi using a FilterTec Normal Flow Filtration System (SciLog).

4) Flux Testing

Water flux was determined by measuring the amount of water passed through membrane samples over a given amount of time. Membrane samples were cut into 44-mm diameter discs and pre-wet with MilliQ-grade water or IPA. The samples were placed into an Amicon 8050 stirred-cell holder (EMD Millipore 5122) with a support disc underneath (3M BLA020 grade nylon microfiltration membrane, available from 3M Company). Stirring was applied by a magnetic stir-plate (Corning PC-420D) and pressure was applied using house air through a regulator (Ingersoll-Rand R37121-100). Water flux tests were conducted at 20 psi (138 kPa) with stirring >200 rpm.

5) Molecular Weight Cutoff (MWCO) Testing

Molecular weight cutoff testing challenged the membrane with solutions containing different molecular weight polymers (1 to 300 kDa) to determine the molecular weight at which solute rejection exceeds 80%.

Challenge solutions were prepared by dissolving polyethylene glycol (PEG) in MilliQ-grade water at 0.1 wt %. Membrane samples were cut into 44-mm diameter discs and pre-wet with water or IPA. The samples were placed into an Amicon 8050 stirred-cell holder (EMD Millipore 5122) with a support disc underneath (3M BLA020 or BLA080 grade nylon microfiltration membrane, available from 3M Company). Stirring was applied by a magnetic stir-plate (Corning PC-420D) and pressure was applied using laboratory compressed air through a regulator (Ingersoll-Rand R37121-100). Samples were initially conditioned by running with MilliQ-grade water at 20 psi (138 kPa) with stirring >200 rpm for a minimum of 40 mL or 15 minutes. The PEG solution was then applied at 20 psi (138 kPa) with stirring >200 rpm. The feed and permeate solutions were analyzed using a Shimadzu Total Organic Carbon Analyzer (Shimadzu Scientific Instruments TOC-L) to compare their relative carbon contents using the polymer combustion peak.

Figure 3:
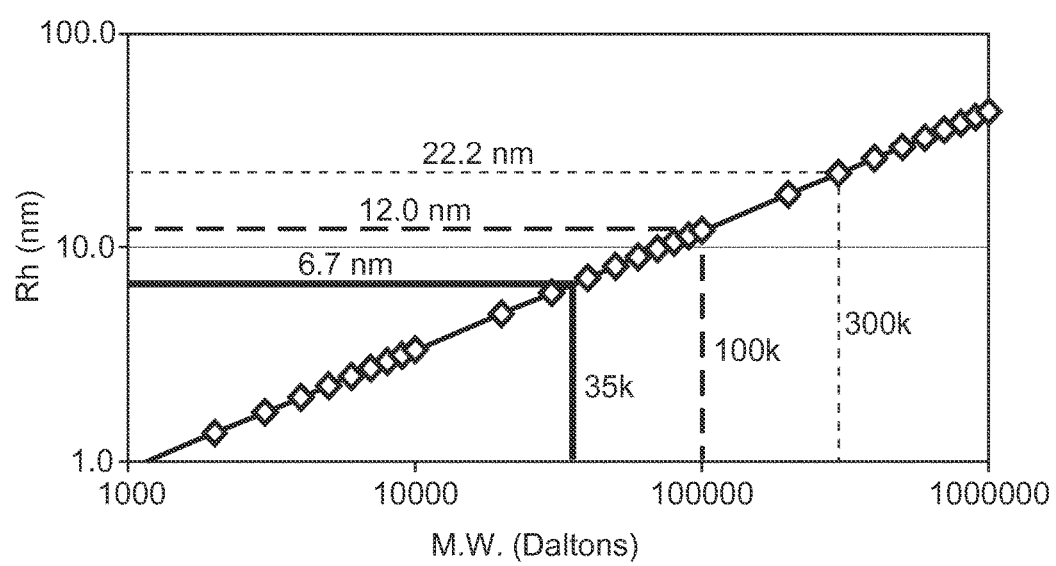
FIG. 3 is a graph correlating PEG molecular weight to hydrodynamic radius.

Using the Mark-Houwink relationship for calculating the hydrodynamic radii of polymers from their molecular weight:

$$R_h \left( \frac{3[\eta]M}{10\pi N} \right)^{1/3} \text{ (cm) and } [\eta] = KM^a$$

the hydrodynamic radii for PEG at different molecular weights[1] were calculated using K=0.4915×10⁻³ and a=0.67. From this, pore sizes were estimated based on the MWCOs (as shown in FIG. 3).

[1] Armstrong et al. *Biophys. J.* 87, 2004, 4259-4270.

6) Scanning Electron Microscope (SEM) Images

A portion of each sample was cut out and mounted on an SEM stub for examination of the surfaces. Cross-sections were made by cutting under LN2 and mounted for examination. Images were taken using a Hitachi S-4700 Field Emission SEM. Magnifications employed included: 5 kx, 10 k, 20 k, 30 kx, and 100 kx (cross-sections); 6 kx, 30 kx, 70 kx, 100 kx. A thin layer of Pt was deposited on the samples to make them conductive. SEM instrument conditions included accelerating voltage of 2.0 KV, 6 mm working distance (wd), UHR-A, pause and fast image capture speeds.

Images were also taken using a FEI Phenom SEM at magnifications 1 kx to 10 kx. A thin layer of gold was sputter coated on the sample to make them conductive. SEM instrument conditions included accelerating voltage of 5.0 KV and 2-11.5 mm working distance (wd).

Nanoporous Coating Solution Preparation

Formulation 1: To a 20-mL glass vial was added 6.0~9.0 g silica aqueous dispersion (10 wt %), 1.0~4.0 g polyvinyl alcohol solution (10 wt % or equivalent amount) and 0.05~0.2 g wetting agent (10 wt %). Small amounts of IPA (0.5 g) were dropwise added into the solution with constant stirring. After the mixture of solutions were homogenous and gas bubbles had escaped, the pH values were adjusted to 2~3 with diluted nitric acid. The coating solutions were continuously stirred for another hour, then settled overnight before use.

Formulation 2: To a 20-mL glass vial was added a 8.0 g silica aqueous dispersion (10 wt %) and 2.96 g Kuraray PVA R-235 (6.75 wt %). The ratio between silica/PVA was either 80/20 or 75/25. A small amount of IPA (0.5 g) was added dropwise into the solution with constant stirring. After the mixtures were homogenous and gas bubbles had escaped, the pH values were adjusted to 2-3 with diluted nitric acid. The coating solutions were continuously stirred for another hour, then settled overnight before use.

Soaking Solution Preparation

Soaking solutions were prepared by mixing water and glycerol at a ratio of 70/30 or 80/20. When the nanoporous coating solutions were layered on top of the soaking solutions in small vials, the interfaces remained distinct for more than 10 min, but mixing occurred slowly and eventually become homogenous solutions after overnight.

Hydrophilizing Solution Preparation

Solution for hydrophilization of PP membranes was prepared by dissolving EVAL 27 in an ethanol/water (60/40 vol/vol) mixture in a vessel. The concentration of the EVAL in the solution is 1.25-3 wt %. The contents of the vessel were stirred. The vessel was placed in a water bath at a temperature of about 80-100° C. for forming a clear solution.

Coating and Curing Procedure

The TIPS membranes films were placed on a dust-free glass plate and gently cleaned with air from a compressed air can. Hand-spreading coating on the TIPS membrane films were prepared by a Meyer bar #6, #12, or #22. The wet coating samples were dried under different temperatures, specifically room temperature (i.e., 20° C.), 40° C., 60° C., and 80° C. The visible appearances were described to evaluate the uniformity before using microscopic tools.

Coating Method Incorporating Soaking Solution

Hydrophilic membranes imbibed with the soaking solution were prepared by Meyer bar coating, dip-coating, or by immersing the membrane into the soaking solutions. After the treatment, excess soaking solution was removed by dabbing the surface of the membranes with paper towels. Then, the membranes were coated with the nanoporous coating solution using a Meyer bar #12 and dried in an 80° C. batch oven.

Example #1 Selection of Wetting Agents

Three different wetting agents solutions (i.e., 2 wt % in DI water) were tested alone before being mixed into coating solutions. As shown in Table 1 below, the POLYSTEP A-18 and B-430S showed nicely wetted films on 0.2 μm TIPS polypropylene (PP) membranes without permeating through the membranes. The wet film coated from a B-19 solution, however, was dewetted on a TIPS PP membrane. The surface tension of each wetting agent suggests the reason. Further experimentation demonstrated that more A-18 than B-430S was required in order to make a well-wetting coating on a membrane film.

TABLE 1

The information of wetting agents and their responses on TIPS PP membrane films.

| POLY-STEP | Name | Formula | Surface Tension at critical micelle concentration (dynes/cm) | Observation |
|---|---|---|---|---|
| A-18 | Sodium $C_{14-16}$ Alpha Olefin Sulfonate | $CH_3(CH_2)_{10-12}CH=CHCH_2SO_3Na$ | 31 | Nicely wetted film |
| B-19 | Sodium lauryl ether sulfate | $CH_3(CH_2)_{11}O(CH_2CH_2O)_{30}SO_3Na$ | 42 | Dewetted |
| B-430S | Sodium Laureth Sulfate | $CH_3(CH_2)_{11}O(CH_2CH_2O)_4SO_3Na$ | 23 | Nicely wetted film |

Example #2 Evaluation of Polyvinyl Alcohol Binders

The nanoporous coating samples were prepared by hand-spread coating with a #22 Meyer bar on one side of symmetric 0.2 μm TIPS PP membranes and dried at room temperature. The coating solutions were prepared in the manner of the "Nanoporous coating solution preparation" description above, with overall 10 wt % of silica dispersion and PVAs in mixed solvents of water:IPA of 95:5. The solutions contained 9.0 grams (g) of 10 wt % DVNSZ004 colloidal silica dispersion, 1.0 g of 10 wt % of one of various PVA solutions (see Table 2 below), 0.2 g of 10 wt % A-18, and 0.5 g IPA. The ratio between silica, PVA and wetting agents were kept the same for evaluation.

TABLE 2

Coating compositions, performance data obtained from hydrolysis of reactive alkoxysilane mixtures, and their shelf-life times at 50° C.

DVNSZ004/PVA/A-18 (90/10/2)

| Control No. | PVA code | Hydrolysis (mol %) | Viscosity (cps) | Coating appearance |
|---|---|---|---|---|
| A | — | — | — | Dewetted |
| B | PVA-03 | 98.0-99.0 | 3.5-4.5 | Coating has strips |
| C | PVA-04 | 98.0-98.8 | 4.0-5.0 | Coating looks spotty |
| D | PVA-05 | 98.0-99.0 | 5.0-6.5 | Coating has strips |
| E | PVA-15 | 98.0-99.0 | 13.0-17.0 | Coating looks spotty |
| F | PVA-20 | 98.0-99.0 | 18.0-22.0 | Good visible uniformity |
| G | PVA-60 | 98.0-99.0 | 58.0-68.0 | Good visible uniformity |
| H | R2105 | 98.0-99.0 | 4.5-6.0 | Good visible uniformity |
| I | R235 | 87.0-89.0 | 80-110 | Good visible uniformity |

A trend was seen in which the more viscous PVA binders (higher MW) tended to give better visible uniformity of top coatings on the membrane films. R2105, having silanol function groups, also provided improved uniformity, but the solution containing it turned into a gel after a couple of days. Hence, PVA-60 and R235 were the candidates of PVA binders selected for further evaluations.

Example #3 Evaluation of Mono Silica and Binary Silica Systems

The nanoporous coating samples were prepared by hand-spread coating with a #22 Meyer bar on one side of symmetric 0.2 μm TIPS PP membranes and dried at room temperature. The coating solutions were prepared in the manner of the "Nanoporous coating solution preparation" description above. The detailed formulation and ratios of silica/PVA/wetting agent are summarized in Tables 3 and 4 below. SEM microscopy images were viewed in order to distinguish the coating uniformity under this condition since most coatings were hard to visually evaluate.

Table 3 below reports mono silica coatings that were systemically studied and evaluated. From small size spherical particles 2326 (~5 nm), medium size spherical particles DVNSZ004 (~42 nm), 2329 (~75 nm), SI-4530 (90 nm), to large size fumed silica particles, 2012A, 2017A, 2020K, 4012K (<200 nm), there was a clear trend that larger silica particles gave better coating uniformity under the same conditions. The best conditions for mono silica coatings were using fumed silica 2020K, which is a medium surface area fumed silica. It is electrostatically stabilized with potassium hydroxide and has an average particle diameter less than 0.2 microns.

TABLE 3

Coating SEM appearances of mono silica system.

| | Top Coating Formulation | | | | |
|---|---|---|---|---|---|
| Sample No. | Mono Silica dispersion | PVA | Wetting agent | Ratio | Coating appearance SEM image |
| 1 | 2326 | PVA-60 | A-18 | 90/10/2 | Coating was spotty, cracked |
| 2 | 2326 | PVA-60 | B-430S | 90/10/2 | Coating was spotty, cracked |
| 3 | DVNSZ004 | PVA-60 | A-18 | 90/10/2 | Coating was cracked, dry pattern |
| 4 | DVNSZ004 | PVA-60 | B-430S | 90/10/2 | Coating was cracked, dry pattern |
| 5 | 2329 | PVA-60 | A-18 | 90/10/2 | Slightly dewetted Coating was cracked, dry pattern |
| 6 | 2329 | PVA-60 | B-430S | 90/10/2 | Coating was cracked, dry pattern |
| 7 | SI-4530 | PVA-60 | B-430S | 90/10/2 | Some cracking lines |
| 8 | SI-4530 | R2105 | B-430S | 90/10/2 | Little cracking. Good uniformity |
| 9 | 2012A | PVA-60 | B-430S | 90/10/2 | Little cracking. Good uniformity |
| 10 | 2017A | PVA-60 | B-430S | 90/10/2 | Some cracking lines |
| 11 | 2020K | PVA-60 | B-430S | 90/10/2 | Few cracking lines |
| 12 | 4012K | PVA-60 | B-430S | 90/10/2 | Some cracking lines |
| 13 | SI-4530 | R2105 | B-430S | 80/20/2 | Spotty, dried pattern |
| 14 | SI-4530 | R2105 | B-430S | 70/30/2 | Quite spotty, dried pattern |
| 15 | 2012A | PVA-60 | B-430S | 80/20/2 | Little cracking. Good uniformity |
| 16 | 2012A | PVA-60 | B-430S | 70/30/2 | Good uniformity |
| 17 | 2020K | PVA-60 | B-430S | 80/20/2 | Little cracking. Good uniformity |
| 18 | 2020K | PVA-60 | B-430S | 70/30/2 | Little cracking. Good uniformity |
| 19 | 2020K | R235 | B-430S | 90/10/2 | Little cracking. Good uniformity |
| 20 | 2020K | R235 | B-430S | 80/20/2 | Good uniformity |
| 21 | 2020K | R235 | B-430S | 75/25/2 | Good uniformity |
| 22 | 2020K | R235 | B-430S | 70/30/2 | Good uniformity |

Coating samples made from binary silica mixtures were viewed under SEM. Table 4 below indicates that again coatings containing 2020K showed good uniformity, despite mixing different silica particles. At this point, SEM image was no longer a sufficient tool to evaluate the top coating since they all had similar morphology on the surfaces.

TABLE 4

Coating SEM appearances of binary silica system.

| Sample No. | Binary Silica dispersion | PVA | Wetting agent | Ratio | Coating appearance SEM image |
|---|---|---|---|---|---|
| 23 | 2326:DVNSZ004 (20:80) | PVA-60 | A-18 | 90/10/2 | Coating was cracked, dry pattern |
| 24 | 2326:DVNSZ004 (20:80) | PVA-60 | B-430S | 90/10/2 | Coating was cracked, dry pattern |
| 25 | 2326:2329 (20:80) | PVA-60 | A-18 | 90/10/2 | Slightly dewetted Coating was cracked, dry pattern |
| 26 | 2326:2329 (20:80) | PVA-60 | B-430S | 90/10/2 | Coating was cracked, dry pattern |
| 27 | 1115:2020K (50:50) | R235 | B-430S | 70/30/2 | Good uniformity |
| 28 | 2326:2020K (50:50) | R235 | B-430S | 70/30/2 | Good uniformity |
| 29 | 1050:2020K (50:50) | R235 | B-430S | 70/30/2 | Good uniformity |
| 30 | 2327:2020K (50:50) | R235 | B-430S | 70/30/2 | Good uniformity |

Example #4 Selection of Top Coating Formulation

In order to further evaluate the performance of coating samples, forward flow bubble point (FFBP) and Gurley tests were conducted.

The nanoporous coating samples were prepared by hand-spread coating with a #22, #12, or #6 Meyer bar on one side of symmetric 0.2 m TIPS PP membranes and dried at room temperature. The coating solutions were prepared in the manner of the "Nanoporous coating solution preparation" description above. The detailed coating conditions and the ratios of silica/PVA/B-430S are summarized in Table 5 below.

TABLE 5

Forward Flow Bubble Point (FFBP) and Gurley tests of selected coating samples

| Sample No. | Top Coating Formulation (silica/PVA/B-430S/IPA) | | | | Performance Test | |
|---|---|---|---|---|---|---|
| | Silica | PVA | Ratio | Meyer bar | FFBP (kPa) | Gurley (s/50 cc) |
| 31 | 2020K | PVA-60 | 70/30 | #22 | 140.7 | NA |
| 32 | 2020K | R235 | 70/30 | #22 | 218.4 | NA |
| 33 | 2020K | R235 | 70/30 | #12 | 160.8 | NA |
| 34 | 2020K | R235 | 70/30 | #6 | 120.0 | NA |
| 35 | 1115:2020K (50:50) | R235 | 70/30 | #22 | 305.4 | NA |
| 36 | 2326:2020K (50:50) | R235 | 70/30 | #22 | 391.6 | NA |
| 37 | 1050:2020K (50:50) | R235 | 70/30 | #22 | 450.2 | NA |
| 38 | 2327:2020K (50:50) | R235 | 70/30 | #22 | 455.0 | 1128.1 |
| 39 | 2327:2020K (50:50) | R235 | 70/30 | #12 | 194.7 | 255.8 |
| 40 | 2327:2020K (50:50) | R235 | 70/30 | #6 | 112.0 | 113.8 |

The symmetric PP TIPS membrane has a FFBP value of 82.7 kPa (12 Psi). All of the coated samples showed improved FFBP pressure, especially samples 37 and 38 (up to 60 Psi (414 kPa)). Sample #38 also showed a feature of narrow pore size distribution and a defect-free coating in the FFBP tester. As expected, the FFBP pressure values gradually dropped and air flux (Gurley values) decreased when the coating thickness decreased (from samples 38-40). From SEM images, minor cracks can still be observed on thinner coating samples. The ideal performance of an ultrafiltration membrane would have a high FFBP value associated with a low Gurley value. The thickness of coating samples made with a #12 Meyer bar were estimated around 2.5 microns, which showed both reasonable FFBP and Gurley values. Further optimization based on the formulation of (2327:2020K)/R235/B-430S was conducted on different membrane substrates, with various mixing ratios and drying temperatures.

Example #5 Optimization on Symmetric and Asymmetric PP Membranes

The nanoporous coating samples were prepared by hand-spread coating with a #12 Meyer bar on the either side of symmetric 0.2 μm TIPS PP membranes and dried at room temperature. The coating solutions were prepared in the manner of the "Nanoporous coating solution preparation" description above. The detailed coating condition, the ratios of (2327:2020K)/R235 and the FFBP & Gurley values are summarized in Table 6 below.

TABLE 6

Forward Flow Bubble Point (FFBP) and Gurley tests of (2327:2020K)/R235/B-430S on symmetric PP membrane, coating dried at room temperature.

| Sample No. | Top Coating Formulation (silica/PVA/B-430S/IPA) | | | | Performance Test | |
|---|---|---|---|---|---|---|
| | Silica | PVA | Ratio | Meyer bar | FFBP (kPa) | Gurley (s/50 cc) |
| 41 | 2327:2020K (50:50) | R235 | 50/50 | #12 | 99.5 | >>600 |
| 42 | 2327:2020K (50:50) | R235 | 55/45 | #12 | 99.8 | >>600 |
| 43 | 2327:2020K (50:50) | R235 | 60/40 | #12 | 153.1 | >>600 |
| 44 | 2327:2020K (50:50) | R235 | 65/35 | #12 | 122.7 | >>600 |
| 45 | 2327:2020K (50:50) | R235 | 70/30 | #12 | 162.0 | 150.6 |
| 46 | 2327:2020K (50:50) | R235 | 75/25 | #12 | 171.7 | 52 |

TABLE 6-continued

Forward Flow Bubble Point (FFBP) and Gurley tests of (2327:2020K)/R235/B-430S on symmetric PP membrane, coating dried at room temperature.

| Sample No. | Top Coating Formulation (silica/PVA/B-430S/IPA) | | | | Performance Test | |
|---|---|---|---|---|---|---|
| | Silica | PVA | Ratio | Meyer bar | FFBP (kPa) | Gurley (s/50 cc) |
| 47 | 2327:2020K (50:50) | R235 | 80/20 | #12 | 357.8 | 36.9 |
| 48 | 2327:2020K (50:50) | R235 | 85/15 | #12 | 144.1 | 26.5 |
| 49 | 2327:2020K (50:50) | R235 | 90/10 | #12 | 112.4 | 20.2 |

With a higher percentage (>35%) of PVA R235 in the coating formulation, the coatings had extremely high Gurley values (>>600), indicating the membranes were partially blocked with very low fluxes. The ratio between 70/30~90/10 of (2327:2020K)/R235 exhibited reasonable Gurley values, but the FFBP values were still far from the values of ultrafiltration membranes.

The same top coatings were also prepared on the tight pore side of an asymmetric PP membrane film, which is a two-zone membrane with a loose pore side (8 psi (55.2 kPa)) and a tight pore side (30 psi (206.8 kPa)). The performance of those samples was significantly improved, as shown in Table 7 below. Further studies of drying temperatures and mixing ratios of 2327:2020K were continued on asymmetric PP membranes.

TABLE 7

Forward Flow Bubble Point (FFBP) and Gurley tests of (2327:2020K)/R235/B-430S on asymmetric PP membrane, coating dried at room temperature.

| Sample No. | Top Coating Formulation (silica/PVA/B-430S/IPA) | | | | Performance Test | |
|---|---|---|---|---|---|---|
| | Silica | PVA | Ratio | Meyer bar | FFBP (kPa) | Gurley (s/50 cc) |
| 50 | 2327:2020K (50:50) | R235 | 50/50 | #12 | 271.7 | >>600 |
| 51 | 2327:2020K (50:50) | R235 | 55/45 | #12 | 347.5 | >>600 |
| 52 | 2327:2020K (50:50) | R235 | 60/40 | #12 | 308.9 | >>600 |
| 53 | 2327:2020K (50:50) | R235 | 65/35 | #12 | 160.7 | 251.4 |
| 54 | 2327:2020K (50:50) | R235 | 70/30 | #12 | 296.5 | 76.1 |
| 55 | 2327:2020K (50:50) | R235 | 75/25 | #12 | 276.5 | 47 |
| 56 | 2327:2020K (50:50) | R235 | 80/20 | #12 | 264.8 | 35.6 |
| 57 | 2327:2020K (50:50) | R235 | 85/15 | #12 | 311.6 | 26.9 |
| 58 | 2327:2020K (50:50) | R235 | 90/10 | #12 | 314.4 | 21.8 |

Example #6 Optimization of Drying Temperatures on Asymmetric PP Membrane

The nanoporous coating samples were prepared by hand-spread coating with a #12 Meyer bar on the tight pore sides of asymmetric TIPS PP membrane. The coating solutions were prepared in the manner of the "Nanoporous coating solution preparation" description above. The detailed coating conditions, the ratios of (2327:2020K)/R235, and the FFBP & Gurley values are summarized in Table 8 below.

TABLE 8

Forward Flow Bubble Point (FFBP) and Gurley tests of (2327:2020K)/R235/B-430S on asymmetric PP membrane, coating dried at 20° C., 40° C., 60° C., and 80° C.

| Sample No. | Top Coating Formulation (silica/PVA/B-430S/IPA) | | | Drying temp (° C.) | Performance Test | |
|---|---|---|---|---|---|---|
| | Silica | PVA | Ratio | | FFBP (kPa) | Gurley (s/50 cc) |
| 59 | 2327:2020K (50:50) | R235 | 70/30 | 20 | 296.5 | 116.4 |
| 60 | 2327:2020K (50:50) | R235 | 70/30 | 40 | 448.9 | 228.2 |
| 61 | 2327:2020K (50:50) | R235 | 70/30 | 60 | 387.5 | 265.9 |
| 62 | 2327:2020K (50:50) | R235 | 70/30 | 80 | 359.2 | 267.6 |
| 63 | 2327:2020K (50:50) | R235 | 75/25 | 20 | 265.5 | 44.9 |
| 64 | 2327:2020K (50:50) | R235 | 75/25 | 40 | 426.1 | 60.7 |
| 65 | 2327:2020K (50:50) | R235 | 75/25 | 60 | 439.6 | 60.3 |
| 66 | 2327:2020K (50:50) | R235 | 75/25 | 80 | >>517.1 | 54.8 |
| 67 | 2327:2020K (50:50) | R235 | 80/20 | 20 | 264.8 | 35.6 |
| 68 | 2327:2020K (50:50) | R235 | 80/20 | 40 | 271.0 | 35.5 |
| 69 | 2327:2020K (50:50) | R235 | 80/20 | 60 | 377.8 | 40.5 |
| 70 | 2327:2020K (50:50) | R235 | 80/20 | 80 | 439.9 | 45.9 |
| 71 | 2327:2020K (50:50) | R235 | 85/15 | 20 | 311.64 | 26.9 |
| 72 | 2327:2020K (50:50) | R235 | 85/15 | 40 | 520.6 | 29.1 |
| 73 | 2327:2020K (50:50) | R235 | 85/15 | 60 | 333.7 | 27.3 |
| 74 | 2327:2020K (50:50) | R235 | 85/15 | 80 | 281.3 | 30.6 |
| 75 | 2327:2020K (50:50) | R235 | 90/10 | 20 | 314.4 | 21.8 |
| 76 | 2327:2020K (50:50) | R235 | 90/10 | 40 | 463.3 | 22.7 |
| 77 | 2327:2020K (50:50) | R235 | 90/10 | 60 | 357.2 | 23.6 |
| 78 | 2327:2020K (50:50) | R235 | 90/10 | 80 | 258.6 | 25.4 |

Figure 4:
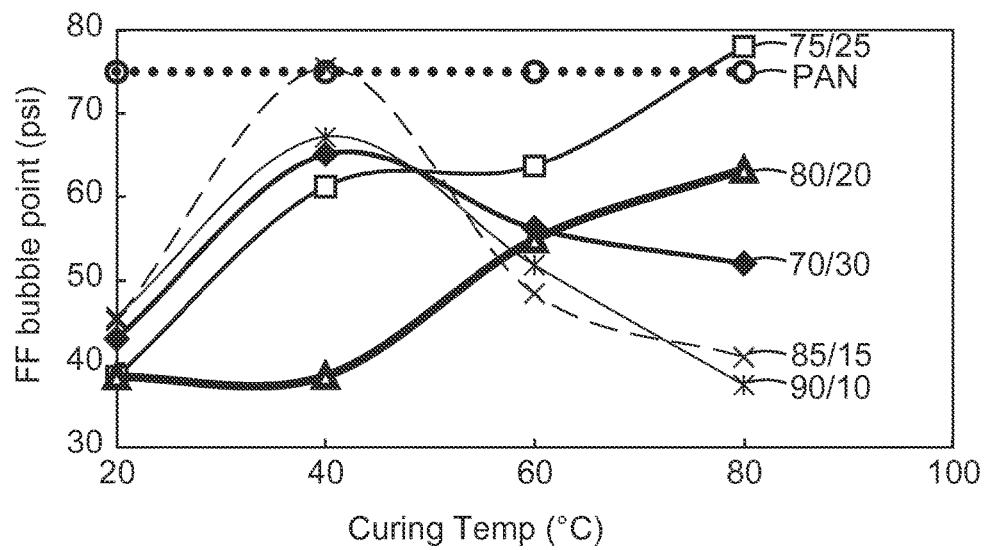
FIG. 4 is a graph of forward flow bubble point of the exemplary coated membranes prepared according to exemplary embodiments of the disclosure.
Figure 5:
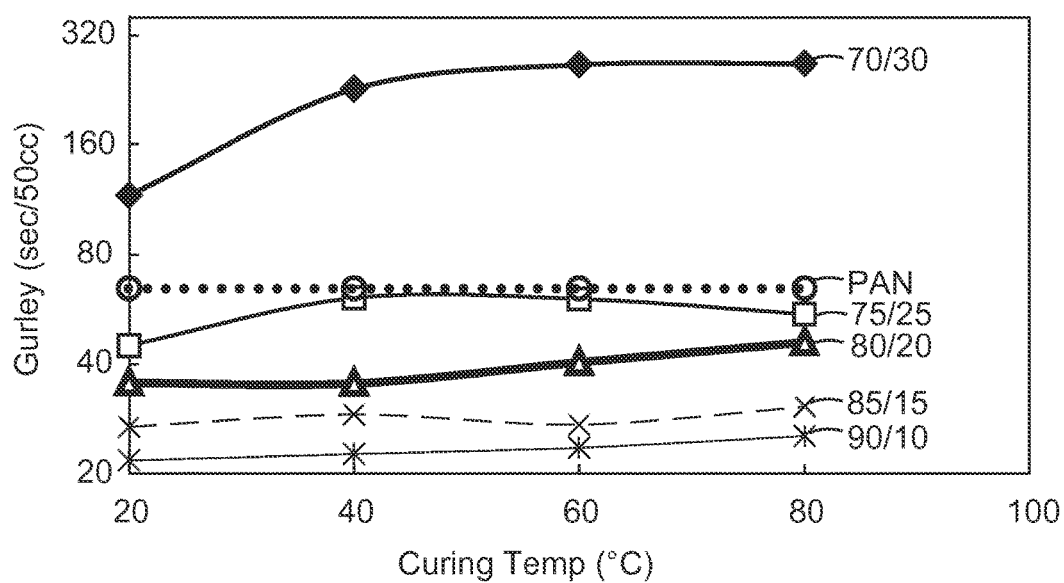
FIG. 5 is a graph of Gurley testing results of the exemplary coated membranes prepared according to exemplary embodiments of the disclosure.

The drying temperature has an important impact on the performance of coating samples even with the same formulation, as also shown in FIGS. 4 and 5. For example, as shown in FIG. 5, the sample prepared from (2327:2020K)/R235 (50:50) 75/25 at 80° C., sample #66, showed comparable results to commercial ultrafiltration polyacrylonitrile (PAN) membrane (with a FFBP value of 74.92 psi (516.6 kPa) and a Gurley value of 64.5, indicated with the dotted line).

Fine tuning of mixing ratios between 2327 and 2020K are shown below. The coating samples were prepared by hand-spread coating with a #12 Meyer bar on the tight pore side of asymmetric TIPS PP membranes and dried at 80° C. The coating solutions were prepared in the manner of the "Nanoporous coating solution preparation" description above. The detailed coating condition, the ratios of (2327:2020K)/R235, and the FFBP & Gurley values are summarized in Table 9 below.

TABLE 9

Forward Flow Bubble Point (FFBP) and Gurley tests of (2327:2020K)/R235/B-430S on asymmetric PP membrane, coating dried at 80° C.

| | Top Coating Formulation (silica/PVA/B-430S/IPA) | | | Drying | Performance Test | |
|---|---|---|---|---|---|---|
| Sample No. | Silica | PVA | Ratio | temp (° C.) | FFBP (kPa) | Gurley (s/50 cc) |
| 79 | 2327:2020K (40:60) | R235 | 75/25 | 80 | 476.4 | 36 |
| 80 | 2327:2020K (55:55) | R235 | 75/25 | 80 | 481.3 | 49.6 |
| 81 | 2327:2020K (50:50) | R235 | 75/25 | 80 | >520.6 | 79.4 |
| 82 | 2327:2020K (55:45) | R235 | 75/25 | 80 | 500.6 | 118.7 |
| 83 | 2327:2020K (60:40) | R235 | 75/25 | 80 | 238.6 | 205.7 |

Interestingly, both FFBP and Gurley values stayed relatively unchanged when the ratio of 2327:2020K was in the range of 40:60~50:50. A sharp decrease of FFBP along with a dramatic increase of Gurley was observed when this ratio passed 55:45. Further study was conducted to better understand these behaviors.

Example #7 Evaluation of Ultrafiltration Performance

To demonstrate ultrafiltration capability, sample #81 from Table 9 above was challenged with Blue Dextran dye with ~2 million MW in solution. The characteristics of the membranes used to generate the permeates are listed in Table 10. Table 10 further reports the permeate color of commercial UF membranes and against the Nylon membrane used as a support.

TABLE 10

Membranes used in Blue Dextran challenge tests to generate permeates.

| Sample | Membrane | Pore size | Permeate Color |
|---|---|---|---|
| Feed Solution | None | N/A | Medium Blue |
| Support #81 | 3M Nylon microfiltration Asymmetric PP membrane | 0.2 μm | Medium Blue Colorless |
| PAN350 | Polyacrylonitrile UF | MWCO~150 kDa | Very pale blue |
| PES2 | Polyethersulphone UF | MWCO~4 kDa | Colorless |

Permeate from Blue Dextran testing was collected from sample #81. For comparison, permeates were also collected from the 0.2 m nylon membrane used as a support and also from commercial ultrafiltration (UF) membranes with different molecular weight cutoffs (PAN350 with MWCO 150 k, and PES2 with MWCO 4 k, available from Sepro Membranes, Oceanside, Calif.). Results are listed in Table 10 above. The permeate for sample #81 was essentially colorless, indicating rejection of the polymer dye molecule. This performance is comparable to permeate for the commercial UF membrane with MWCO~4 kDa. Meanwhile, the permeate through the nylon membrane used as a support for the sample #81 test looked as colored as that of the control case.

In order to quantitatively compare the ultrafiltration performance of coated samples with commercially available UF membrane, flux test and molecular weight cutoff (MWCO) tests were conducted. The data are summarized in Table 11 below. The Millipore Ultracel membranes (10 k) are available from EMD Millipore (Billerica, Mass.); the Pall Omega membranes (10 k and 50 k) are available from Pall Corporation (Port Washington, N.Y.); and the GE Nuclepore track-etched polycarbonate membranes (0.015 and 0.05 μm) are available from GE Healthcare Bio-Sciences Corporation (Piscataway, N.J.).

TABLE 11

Average flow rate and MWCOs of commercial UF membranes and coated asymmetric PP and ECTFE membranes.

| Sample | Top coating solution composition | Avg. Flow rate (lmh/bar) | MWCO* (kDa) | Estimated Pore Size (nm) |
|---|---|---|---|---|
| Millipore Ultracel 10k-#1 | | 57 | | |
| Millipore Ultracel 10k-#2 | | 57 | | |
| Pall Omega 10k-#1 | | 78 | | |
| Pall Omega 10k-#2 | | 78 | | |
| Pall Omega 50k-#2 | | 787 | | |
| GE-0.015 μm | | 5 | | |
| GE-0.05 μm | | 282 | | |
| Asymmetric PP membrane #84 | 2020K/R235/B430s 90/10/2 | 496 | 300 | 44 |
| Asymmetric PP membrane #85 | 2020K/R235/B430s 80/20/2 | 210 | 100 | 24 |
| Asymmetric PP membrane #86 | 2020K/R235/B430s 75/25/2 | 65 | 35 | 13 |
| Asymmetric PP membrane #87 | (2020K:2327)/R235/B430s (87.5:12.5) 80/20/2 | 114 | 100 | 24 |
| Asymmetric PP membrane #88 | (2020K:2327)/R235/B430s (75:25) 80/20/2 | 77 | 35 | 13 |
| Asymmetric PP membrane #89 | (2020K:2327)/R235/B430s (50:50) 80/20/2 | 8 | 6 | 5 |
| Symmetric ECTFE membrane #90 | 2020K/R235/B430s 90/10/2 | 429 | 300 | 44 |
| Symmetric ECTFE membrane #91 | 2020K/R235/B430s 80/20/2 | 51 | 100 | 24 |

TABLE 11-continued

Average flow rate and MWCOs of commercial UF membranes and coated asymmetric PP and ECTFE membranes.

| Sample | Top coating solution composition | Avg. Flow rate (lmh/bar) | MWCO* (kDa) | Estimated Pore Size (nm) |
|---|---|---|---|---|
| Symmetric ECTFE membrane #92 | 2020K/R235/B430s 75/25/2 | 25 | 35 | 13 |

*Lowest molecular weight at which 80% rejection is observed

As shown in the table, asymmetric PP membranes with coated top selective layer demonstrate comparable performance to commercial UF membranes. An advantage is the performance of the top selective layer being tunable by changing the ratios of silica/PVA and large/small silica particles regardless of using the same PP membrane supports. It also works on ECTFE membranes. The same top layers (#90-92) gave us the same selectivity despite using different types of membranes.

Figure 6A:
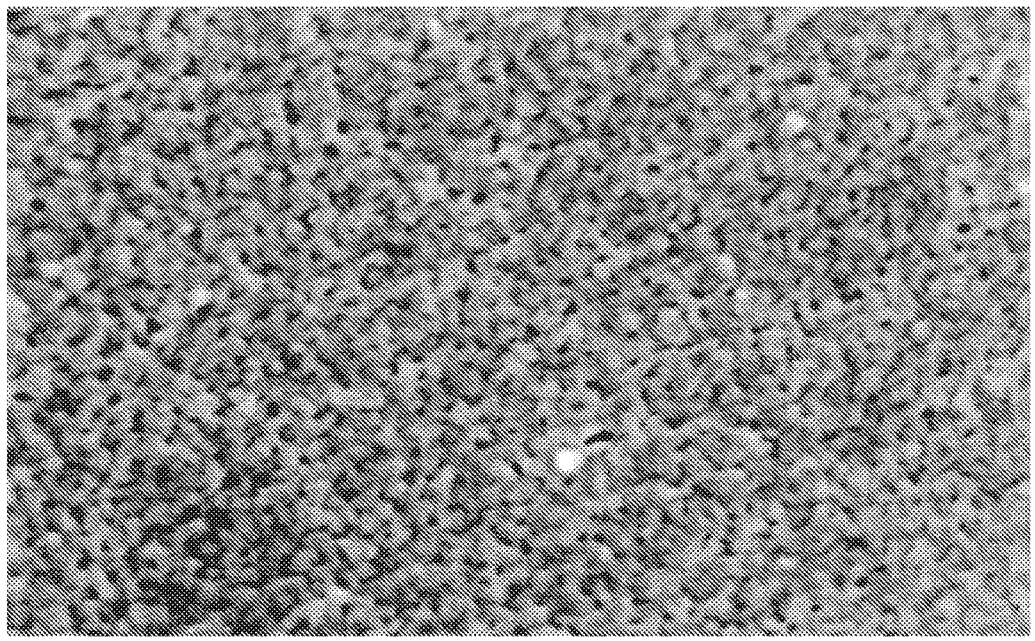
FIG. 6A is a Scanning Electron Microscope (SEM) image of a commercial ultrafiltration membrane surface at a magnification of 100 k times.
Figure 6B:
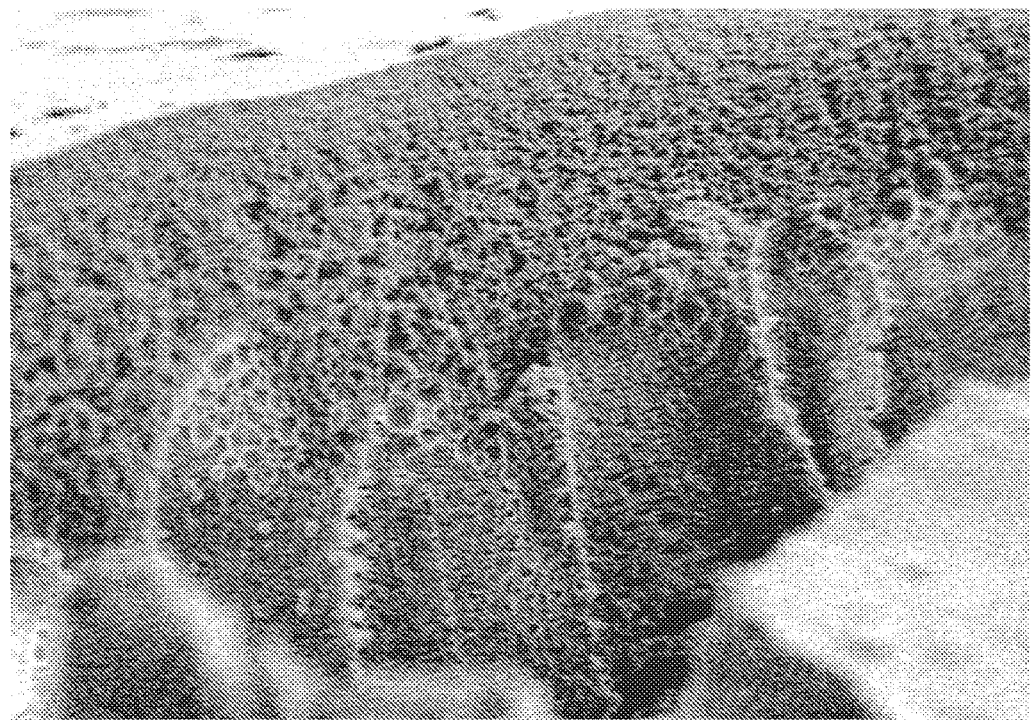
FIG. 6B is an SEM image of the commercial ultrafiltration membrane of FIG. 6A, of a cross-section of the membrane at a magnification of 10 k times.

FIG. 6A provides an SEM image of a Pall Omega OM050150 membrane with molecular weight cutoff of 50 k surface at a magnification of 100 k times. FIG. 6B is an SEM image of the cross-section of the Pall Omega membrane at a magnification of 1 Ok times.

Figure 7A:
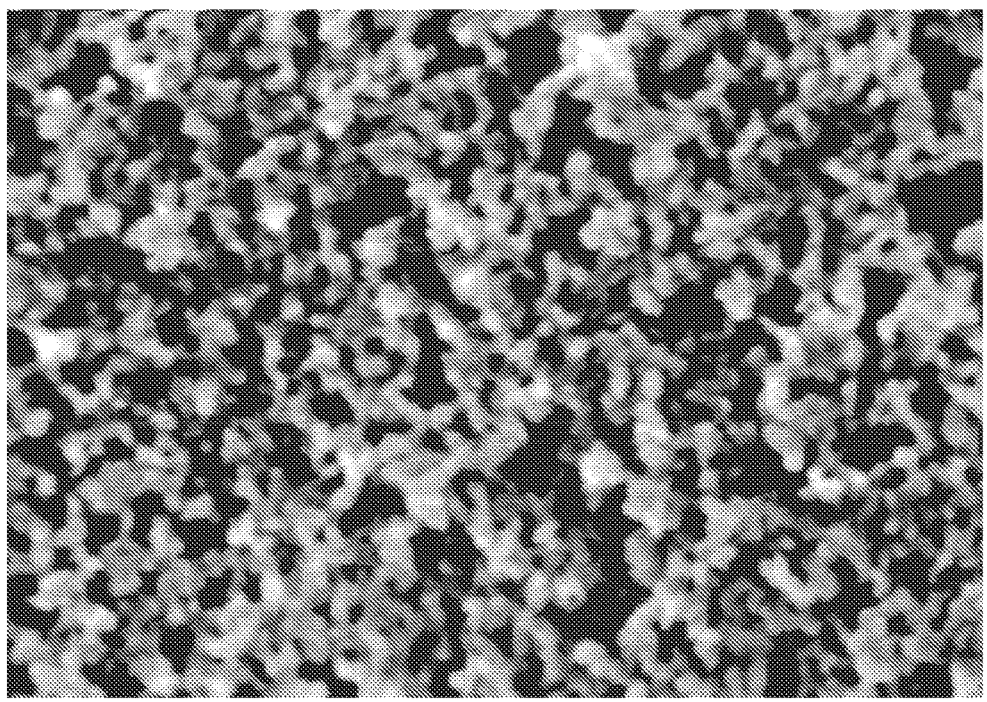
FIG. 7A is an SEM image of an exemplary coated membrane surface at a magnification of 100 k times.
Figure 7B:
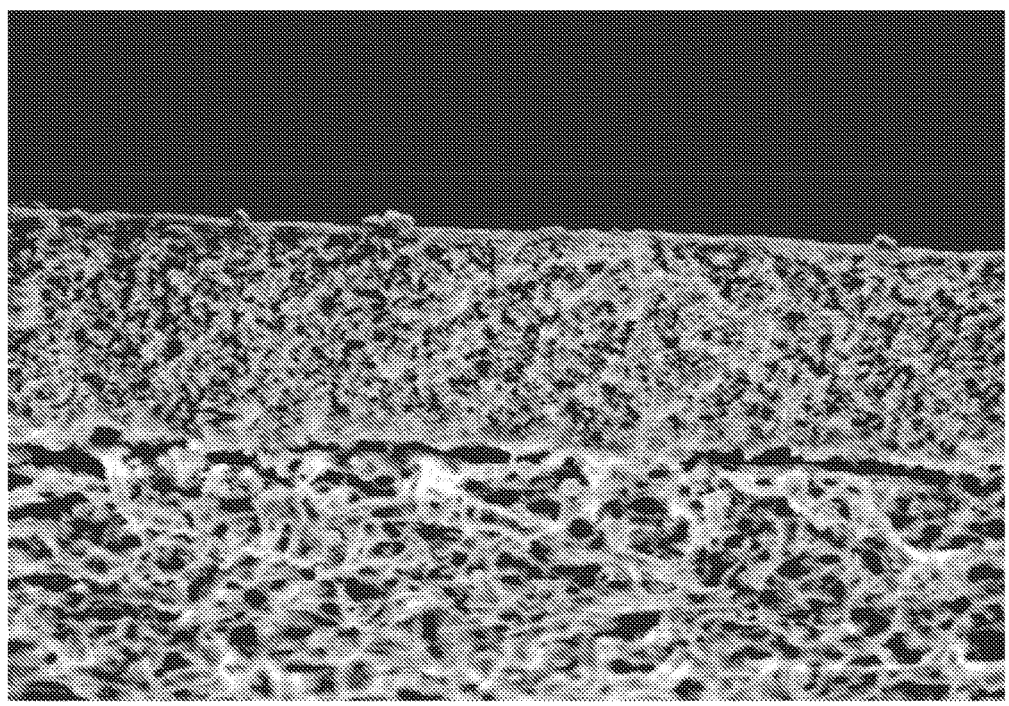
FIG. 7B is an SEM image of the exemplary coated membrane of FIG. 7A, of a cross-section of the membrane at a magnification of 10 k times.

FIG. 7A is an SEM image of the top surface of Asymmetric PP membrane #85 at a magnification of 100 k times. FIG. 7B is an SEM image of the cross-section of the #85 membrane at a magnification of 10 k times.

Figure 8A:
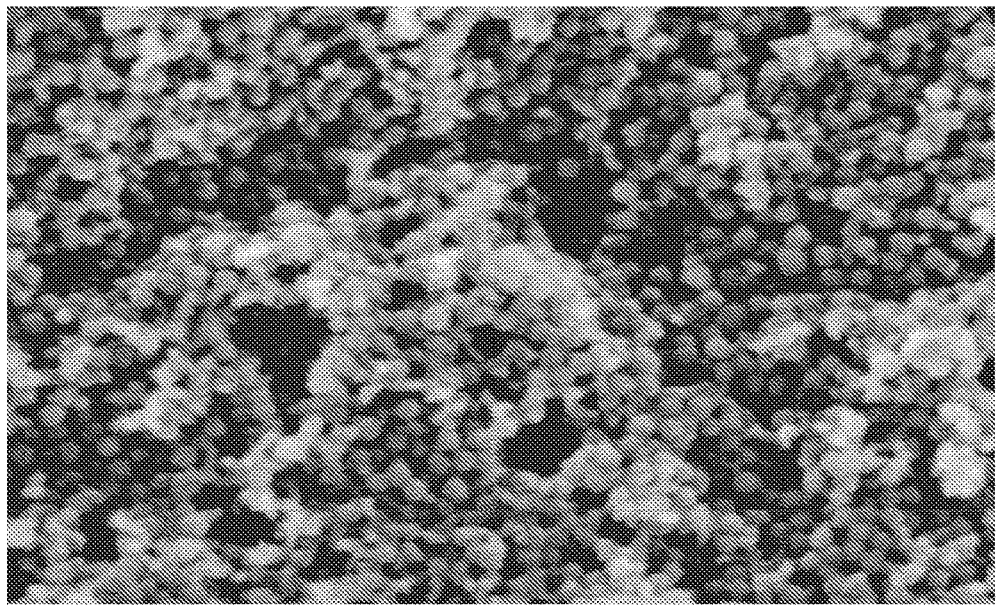
FIG. 8A is an SEM image of another exemplary coated membrane surface at a magnification of 100 k times.
Figure 8B:
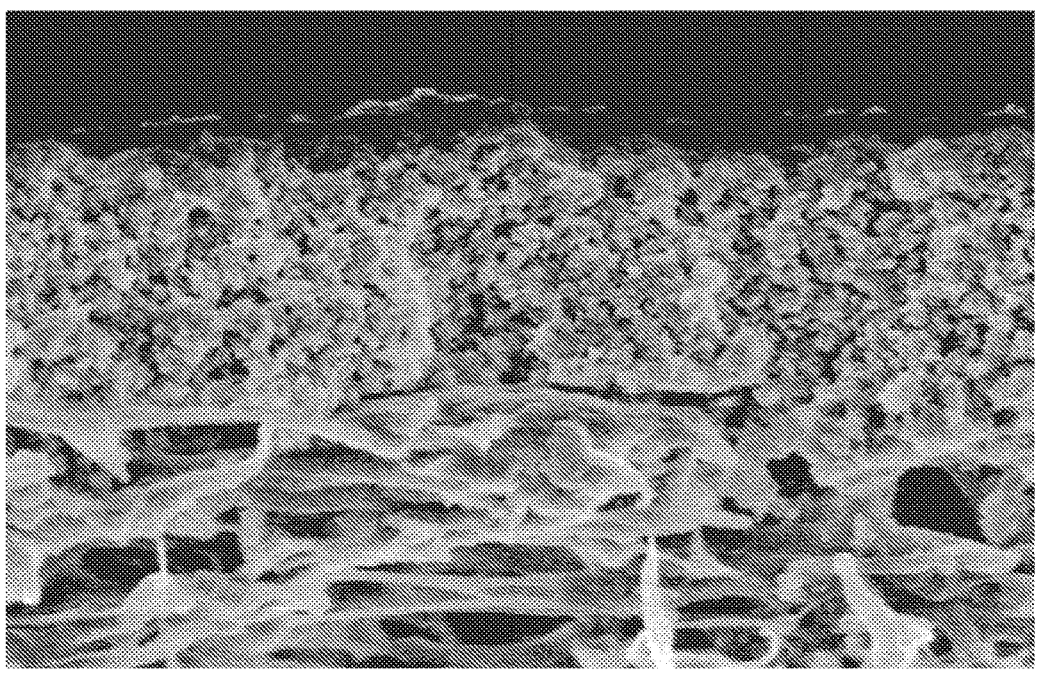
FIG. 8B is an SEM image of the exemplary coated membrane of FIG. 8A, of a cross-section of the membrane at a magnification of 30 k times.

FIG. 8A is an SEM image of the top surface of Asymmetric PP membrane #89 at a magnification of 100 k times. FIG. 8B is an SEM image of the cross-section of the #89 membrane at a magnification of 30 k times.

FIG. 9A is an SEM image of the top surface of Asymmetric PP membrane #91 at a magnification of 100 k times. FIG. 9B is an SEM image of the cross-section of the #91 membrane at a magnification of 20 k times.

Example #8 Evaluation of Different Polymer Binders

Other types of polymer binders were also evaluated to construct the UF membranes on asymmetric PP membranes. The coating solutions were prepared in the manner of the "Nanoporous coating solution preparation" description above, and the final solutions had a pH value of 2~3. The compositions and results are summarized in Table 12 below.

TABLE 12

Average flow rate and MWCOs of coated asymmetric PP membranes with various binders.

| | Top Coating Formulation (silica/polymer/B430s) | | | Drying | Performance Test | |
|---|---|---|---|---|---|---|
| Sample No. | Silica | Polymer binder | Ratio | temp (° C.) | Avg. Flow rate (lmh/bar) | MWCO* (kDa) |
| 93 | 2020K | Dextran (100k) | 80/20 | 80 | 1030 | |
| 94 | 2020K | Dextran (249k) | 80/20 | 80 | 1267 | |
| 95 | 1115 | NeoRez R966 | 75/25 | 80 | 730 | 100~300 |
| 96 | 2326/1115 (4:1) | NeoCryl A612 | 80/20 | 80 | 1200 | >300 |
| 97 | 2326/1115 (4:1) | Poly(acrylamide-acylic acid, 70% carboxy) | 80/20 | 80 | 3400 | 300 |

*Lowest molecular weight at which 80% rejection is observed

Figure 10A:
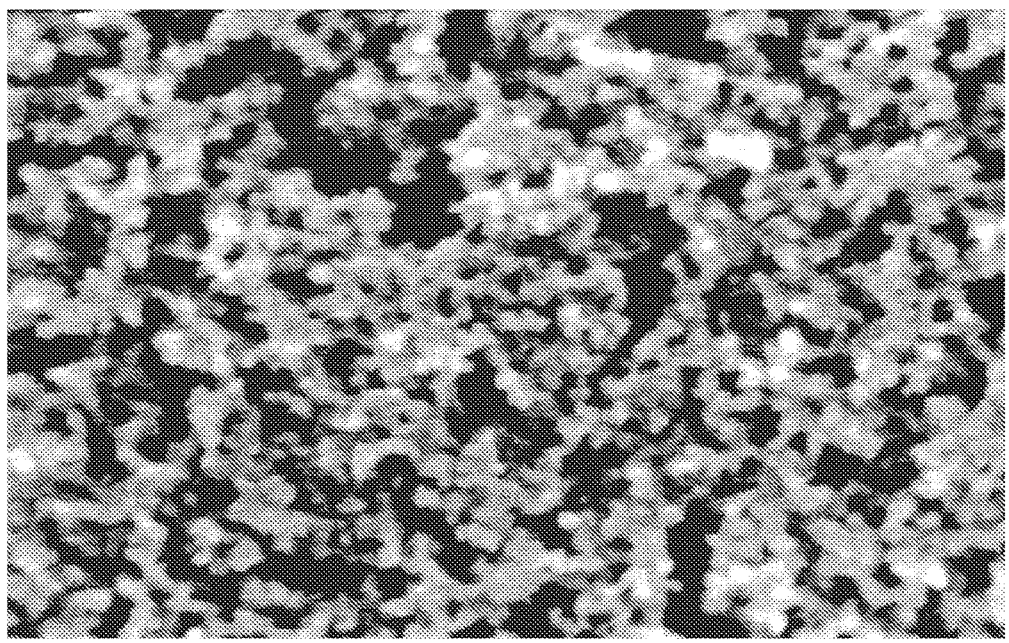
FIG. 10A is an SEM image of a still further exemplary coated membrane surface at a magnification of 100 k times.
Figure 10B:
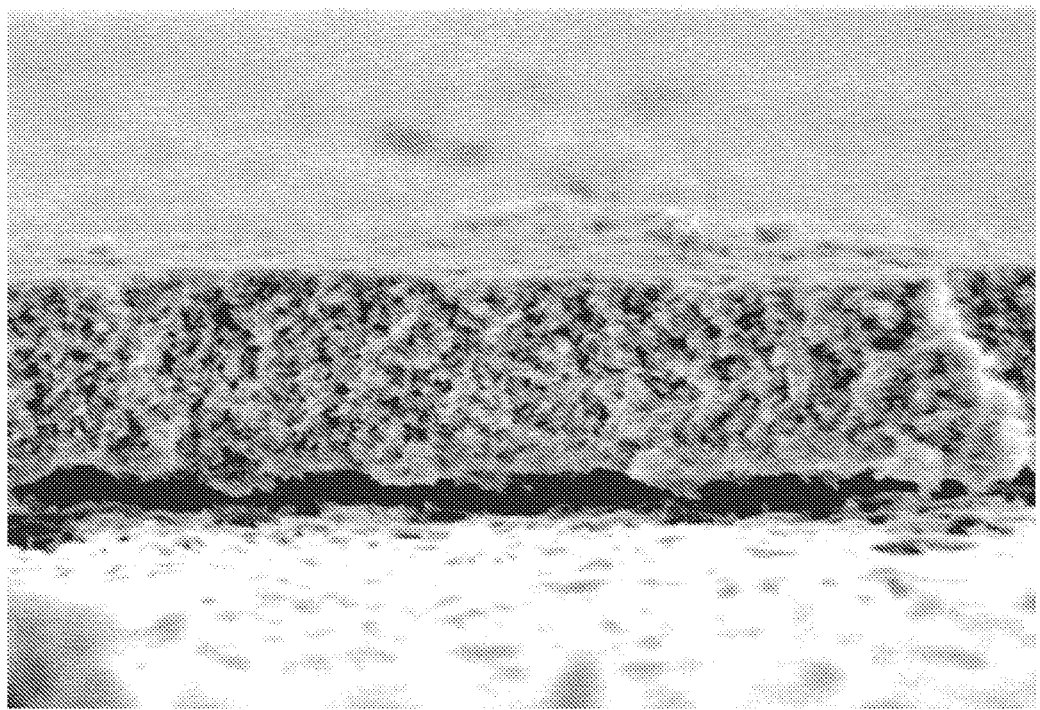
FIG. 10B is an SEM image of the exemplary coated membrane of FIG. 10A, of a cross-section of the membrane at a magnification of 10 k times.

FIG. 10A is an SEM image of the top surface of asymmetric PP membrane #93 at a magnification of 100 k times. FIG. 10B is an SEM image of the cross-section of the #93 membrane at a magnification of 10 k times.

Example #9 Continuous Coating on ECTFE Membrane

Coating solutions of 2020K/R235/B430s were prepared. The solutions were coated onto a roll of PFC020-ECTFE 0.2 UM membrane using an experimental-scale roll-to-roll coating line equipped with a slot die. The coating solutions were metered using a syringe pump at 5 mL/min. The coating speed was controlled at 5 feet per minute (1.524 meters per minute) and the coating width was 4 inches (10.16 centimeters). The coated membrane was dried out at 200° F. (93.3° C.) on the line.

TABLE 13

Average flow rate and MWCOs of continuously coated ECTFE membranes with top coating formulation 2020K/R235/B430s.

| Sample No. | Top coating solution composition | Avg. Flow rate (lmh/bar) | MWCO* (kDa) | Estimated Pore Size (nm) |
|---|---|---|---|---|
| 98 | 2020K/R235/B430s 75/25/2 | 23 | 35 | 13 |
| 99 | 2020K/R235/B430s 80/20/2 | 24 | 35 | 13 |

*Lowest molecular weight at which 80% rejection is observed
Cross-sectional SEM images revealed a coating thickness of 4 μm for Sample #98 and of 7 μm for Sample #99. The selectivities, as characterized by MWCO, were comparable to or better than Samples #91 and #92, with similar coating solution compositions.

Example #10 Evaluation of Ultrafiltration Performance on Hydrophilic Membranes

The ultrafiltration performance was also evaluated with the nanoporous top coating on hydrophilic membranes. As shown in Table 14 below, the same coating formulation 2020K/R235/B430s (75/25/2) was applied on nylon, PES and PVDF membranes and dried at 80° C. This coating formulation was identical to that applied in Sample #86 on asymmetric PP membrane and Sample #92 on symmetric ECTFE membrane, which have 35 k MWCOs.

Despite having the same coating, the estimated pore sizes for the coated samples hydrophilic membranes are larger (100 k and 300 k). SEM images of the coated samples revealed the presence of intermittent fine cracks in the coatings on the hydrophilic membranes.

TABLE 14

Average flow rate and MWCOs of coated hydrophilic membranes with top coating formulation 2020K/R235/B430s (75/25/2).

| Sample No. | Hydrophilic Membrane | | Performance Test | | |
|---|---|---|---|---|---|
| | Vendor | Polymer binder | Avg. Flow rate (lmh/bar) | MWCO* (kDa) | Estimated Pore Size (nm) |
| 100 | 3M | LifeASSURE BLA 020 grade nylon membrane | 98 | 100 | 24 |
| 101 | Membrana | MicroPES 2F PH polyethersulfone membrane | 88 | 300 | 44 |
| 102 | EMD Millipore | Durapore Membrane, PVDF, Hydrophilic, 0.22 μm | 70 | 300 | 44 |

*Lowest molecular weight at which 80% rejection is observed

Example #11 Coatings on PES Membranes Using a Soaking Solution

Sheets of Membrana MicroPES 1F PH were imbibed using water/glycerol soaking solutions before coating with 80/20 or 75/25 2020K/R235 solutions using a #12 Meyer bar. The coating method was described above.

TABLE 15

Average flow rate and MWCOs of coated PES membranes with top coating formulation 2020K/R235/.

| Sample No. | Soaking solution water/gly-cerol ratio | Top coating solution composition | Avg. Flow rate (lmh/bar) | MWCO* (kDa) | Estimated Pore Size (nm) |
|---|---|---|---|---|---|
| 103 | 70/30 | 2020K/R235 80/20 | 353 | 600 | 65 |
| 104 | 70/30 | 2020K/R235 75/25 | 347 | 600 | 65 |
| 105 | 80/20 | 2020K/R235 80/20 | 364 | 600 | 65 |

Example #12 Coatings on Hydrophilized Symmetric PP Using Soaking Solutions

A roll of standard F100 0.45 μm grade 3M PP TIPS membrane was hydrophilized using an EVAL 27 coating solution prepared at 3 wt % according to the method above. The solution was applied by using a roll-to-roll process to saturate the membrane. (The coating technique could have been either a dip tank, slot die, or other suitable coating method.) The coated membrane was then allowed to dry at 100-130° F. (37.8-54.4° C.) in an air floatation oven (any low temperature drying apparatus would have been suitable). These were then imbibed using water/glycerol soaking solutions before coating with 80/20 2020K/R235 solutions using a #12 Meyer bar.

TABLE 16

Average flow rate and MWCOs of coated hydrophilized symmetric PP membranes with top coating formulation 2020K/R235.

| Sample No. | Soaking solution water/glyc-erol ratio | Top coating solution composition | Avg. Flow rate (lmh/bar) | MWCO* (kDa) | Estimated Pore Size (nm) |
|---|---|---|---|---|---|
| 106 | 80/20 | 2020K/R235 80/20 | 507 | >300 | >44 |
| 107 | 70/30 | 2020K/R235 80/20 | 792 | 600 | 65 |

Example #13 Coatings on Hydrophilized Asymmetric PP Using Soaking Solutions

Sheets of the two-zone PP experimental membrane were hydrophilized using an EVAL 27 coating solution prepared at 1.25 weight percent according to the method above. The solution was applied to the membrane by placing individual sheets into a polyethylene (PE) bag. One end of the PE bag was sealed, and the other end of the bag was open. The coating solution was added to the open end of the PE bag coating the membrane, and the other end of the PE bag was sealed. After the membrane was saturated (e.g., soaked) with the coating solution, the sealed PE bag was opened and the membrane was removed from the PE bag. Any excess coating solution was removed by gentle dabbing with a paper towel. The saturated membrane was exposed to air at about 23° C. for about 12 hours for the ethanol and water to evaporate to provide for an instantly wettable hydrophilic membrane in water. These sheets were then imbibed with water/glycerol soaking solutions before coating with 75/25 or 80/20 2020K/R235 solutions using a #12 Meyer bar. The estimated pore size of Sample #109, as characterized by MWCO, was slightly higher than for similar coating solutions on hydrophobic asymmetric PP substrates (e.g., Samples 85 and 86).

TABLE 17

Average flow rate and MWCOs of coated hydrophilized asymmetric PP membranes with top coating formulation 2020K/R235.

| Sample No. | Soaking solution water/glycerol ratio | Top coating solution composition | Avg. Flow rate (lmh/bar) | MWCO* (kDa) | Estimated Pore Size (nm) |
|---|---|---|---|---|---|
| 108 | 70/30 | 2020K/R235 80/20 | 543 | 600 | 65 |
| 109 | 80/20 | 2020K/R235 80/20 | 91 | 300 | 44 |

Example #14 Coatings on a Ceramic Membrane

Anopore circular ceramic membrane discs with a 0.2 µm pore size were purchased from GE Healthcare Bio-Sciences (Piscataway, N.J.) (WHATMAN Anodisc Circle without support ring, 47-mm diameter, 0.2 µm pore size, Catalog No 6809-5522). Coating solutions were prepared according to the "Nanoporous coating solution preparation" description above, and having a total solids weight of 9%. The ratios of CAB-O-SPERSE 2020K/Kuraray PVA R-235/POLYSTEP B-430S were 80/20/2 and 75/25/2, respectively.

A ceramic membrane disc was placed on a pre-wetted VWR International microscope slide glass (2 inches×3 inches (5.1 cm×7.6 cm), 1.0 mm thick, Catalog No 48382-179, Radnor Pa. 19087). The surface of the ceramic disc was dry but the interface between the disc and the glass remained wet for dip-coating. The sample was submerged into a coating solution and pulled up vertically at a rate of 50 mm/min, then dried for 10 minutes in an 80° C. oven. After curing, the sample was soaked in a DI water bath for 3 minutes and the coated ceramic membrane disc was detached from the slide glass. The coated disc was allowed to dry completely before the testing.

The coated samples were tested using the "Blue dextran filtration test". They were wetted with DI water and tested without any additional supports, using an applied pressure of 20 psi. The permeate for a control uncoated ceramic disc was light blue, while the permeates for both the 75/25/2 and 80/20/2 2020 k/R235/B-430 coatings were completely colorless.

Figure 11:
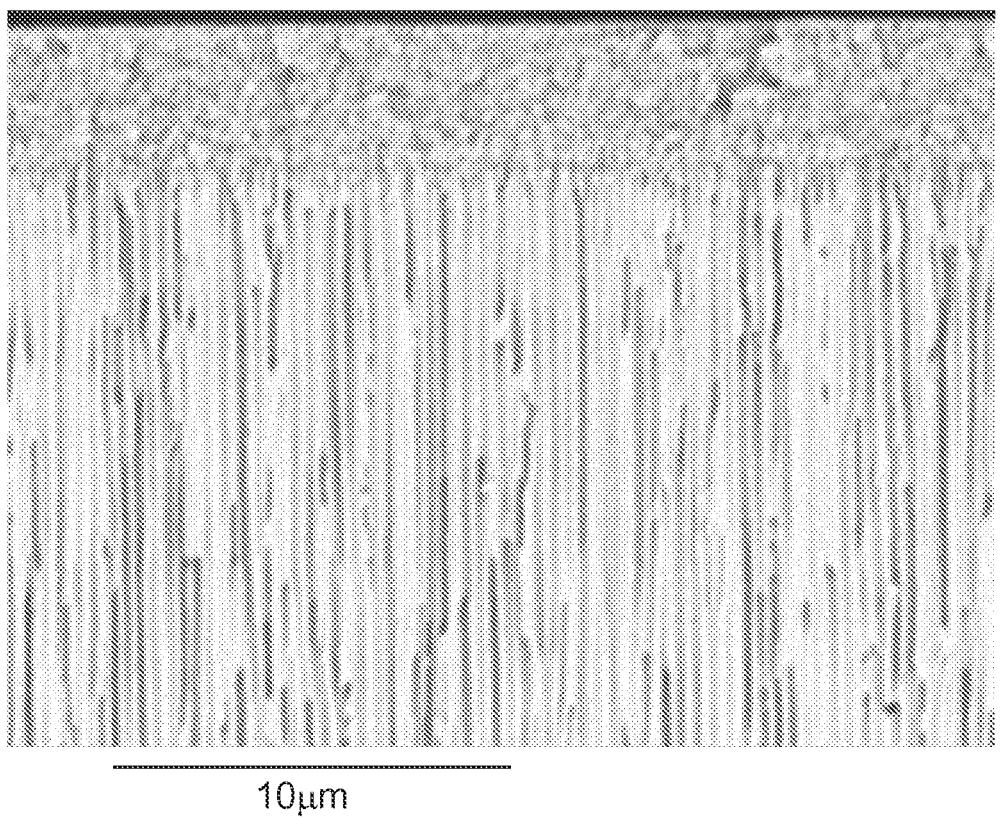
FIG. 11 is an SEM image of yet another exemplary coated membrane surface at a magnification of 8 k times.

Cross sectional SEM showed a packed nanoparticle coating on the ceramic disc similar in appearance to those coated onto polymer membrane substrates. FIG. 11 is an SEM image of the cross-section of the coated ceramic disc at a magnification of 8 k times. The effective coating thickness for the 75/25/2 2020 k/R235/B-430 was 3 to 4 µm and the effective coating thickness for the 80/20/2 2020 k/R235/B-430 was 5 to 6 µm.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth herein-above. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

The invention claimed is:

1. A multilayer article comprising:
    a) a first microfiltration membrane layer, the first microfiltration membrane layer having a first major surface and a second major surface disposed opposite the first major surface; and
    b) a first silica layer directly attached to the first major surface of the first microfiltration membrane layer, the first silica layer comprising a polymeric binder and a plurality of acid-sintered interconnected silica nanoparticles arranged to form a continuous three-dimensional porous network.

2. The multilayer article of claim 1, wherein the polymeric binder comprises poly(vinyl alcohol) (PVA), dextran, a urethane resin, or an acrylate resin.

3. The multilayer article of claim 1, wherein the first silica layer further comprises a surfactant.

4. The multilayer article of claim 1, wherein the silica nanoparticles comprise average particle size diameters less than or equal to 200 nanometers (nm).

5. The multilayer article of claim 1, wherein a weight ratio of the silica nanoparticles to the polymer binder is in a range from 90:10 to 70:30.

6. The multilayer article of claim 1, wherein the first microfiltration membrane comprises an asymmetric membrane.

7. The multilayer article of claim 1, wherein the first major surface of the first microfiltration membrane comprises an average pore size of 50 nm to 500 nm.

8. The multilayer article of claim 1, wherein the first silica layer comprises an average pore size of 1 nm to 100 nm.

9. The multilayer article of claim 1, wherein the first silica layer comprises an average thickness of 0.1 to 10.0 µm.

10. The multilayer article of claim 1, wherein the article is a battery separator or an ultrafiltration membrane.

11. A method of making a multilayer article comprising:
    a) providing a first microfiltration membrane layer, the first microfiltration membrane layer having a first major surface and a second major surface disposed opposite the first major surface; and
    b) forming a first silica layer on the first major surface, comprising a polymeric binder and a plurality of acid-sintered interconnected silica nanoparticles arranged to form a continuous three-dimensional porous network.

12. The method of claim 11, wherein forming the first silica layer comprises preparing a dispersion containing the polymer and the silica nanoparticles acidified with an acid having a pKa less than 3.5 to a pH in a range of 2 to 5, coating the dispersion on the substrate to form a coating, and drying the coating to form the plurality of acid-sintered silica nanoparticles.

13. The method of claim 12, wherein the dispersion further comprises an alcohol.

14. The method of claim 11, wherein the drying comprises subjecting the coating to a temperature of 40 degrees Celsius to 250 degrees Celsius.

15. The method of claim 11, wherein the silica nanoparticles comprise average particle size diameters less than or equal to 200 nanometers (nm).

16. A multizone article comprising:
a) a first porous zone comprising first average pore size; and
b) a second porous zone integral with the first porous zone and having a second average pore size, the second porous zone comprising a polymeric binder and a plurality of acid-sintered interconnected silica nanoparticles arranged to form a continuous three-dimensional porous network.

17. The multizone article of claim 16, wherein the polymeric binder comprises poly(vinyl alcohol) (PVA), dextran, a urethane resin, or an acrylate resin.

18. The multizone article of claim 16, wherein the silica nanoparticles comprise average particle size diameters less than or equal to 200 nanometers (nm).

19. The multizone article of claim 16, wherein the first porous zone comprises an asymmetric membrane and the second porous zone is integral to the asymmetric membrane at a portion comprising a smaller average pore size than the pores of a major surface of the asymmetric membrane opposite the second porous zone.

20. The multizone article of claim 16, wherein the second porous zone comprises an average pore size of 1 nm to 100 nm.

* * * * *

UNITED STATES PATENT AND TRADEMARK OFFICE
CERTIFICATE OF CORRECTION

PATENT NO. : 10,328,389 B2
APPLICATION NO. : 15/300022
DATED : June 25, 2019
INVENTOR(S) : Xuan Jiang Page 1 of 2

It is certified that error appears in the above-identified patent and that said Letters Patent is hereby corrected as shown below:

In the Specification

Column 15,
Line 1, delete "m" and insert -- µm --, therefor.

Column 21,
Line 26, delete "(m)." and insert -- (µm). --, therefor.

Column 26,
Line 44, delete "3[n]M" and insert -- 3[η]M --, therefor.
Line 44, delete "[n]" and insert -- [η] --, therefor.

Column 30,
Line 25, delete "(90" and insert -- (~90 --, therefor.

Column 31,
Line 43, delete "m" and insert -- µm --, therefor.

Column 36,
Line 18, delete "m" and insert -- µm --, therefor.

Columns 35 & 36,
Line 46, delete "10k-#l" and insert -- 10k-#1 --, therefor.
Line 48, delete "10k-#l" and insert -- 10k-#1 --, therefor.

Column 37,
Line 47, delete "1 0k" and insert --10 k --, therefor.

Signed and Sealed this
Twenty-second Day of October, 2019

Andrei Iancu
*Director of the United States Patent and Trademark Office*

Column 41,
Line 51, delete "2020 k/" and insert -- 2020k/ --, therefor.
Line 58, delete "2020 k/" and insert -- 2020k/ --, therefor.
Line 59, delete "2020 k/" and insert -- 2020k/ --, therefor.